(12) United States Patent
Panteleev et al.

(10) Patent No.: US 10,484,926 B2
(45) Date of Patent: Nov. 19, 2019

(54) METHODS TO ENABLE HIGH DATA RATE RELAY OPERATION USING D2D AIR-INTERFACE

(71) Applicant: INTEL CORPORATION, Santa Clara, CA (US)

(72) Inventors: Sergey Panteleev, Nizhny Novgorod (RU); Alexey Khoryaev, Nizhny Novgorod (RU); Sergey Sosnin, Zavolzhie (RU); Mikhail Shilov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/742,801

(22) PCT Filed: Dec. 23, 2015

(86) PCT No.: PCT/US2015/000273
§ 371 (c)(1),
(2) Date: Jan. 8, 2018

(87) PCT Pub. No.: WO2017/026970
PCT Pub. Date: Feb. 16, 2017

(65) Prior Publication Data
US 2018/0206176 A1 Jul. 19, 2018

Related U.S. Application Data

(60) Provisional application No. 62/204,227, filed on Aug. 12, 2015.

(51) Int. Cl.
*H04W 40/22* (2009.01)
*H04W 76/14* (2018.01)
(Continued)

(52) U.S. Cl.
CPC .......... *H04W 40/22* (2013.01); *H04B 17/318* (2015.01); *H04W 28/04* (2013.01);
(Continued)

(58) Field of Classification Search
CPC ... H04B 17/318; H04L 1/1854; H04L 1/1887; H04L 2001/0097; H04W 28/04;
(Continued)

(56) References Cited

U.S. PATENT DOCUMENTS

2010/0167743 A1* 7/2010 Palanki .................. H04B 7/155
455/436
2013/0322287 A1* 12/2013 Bontu ................... H04L 1/0015
370/252
(Continued)

FOREIGN PATENT DOCUMENTS

WO 2012109725 A2 8/2012

OTHER PUBLICATIONS

International Search Report and Written Opinion for International Patent Application No. PCT/US2015/000273 dated Apr. 26, 2016; 17 pages.
(Continued)

*Primary Examiner* — Babar Sarwar
(74) *Attorney, Agent, or Firm* — Schwabe, Williamson & Wyatt, P.C.

(57) ABSTRACT

There are disclosed methods and apparatus for enabling high data rate relay operation using the D2D air interface including a User Equipment (UE) for transmitting and receiving data via a sidelink interface under control of an Evolved Node B (eNB), the UE comprising: receive circuitry to receive a reference signal on a sidelink interface; control circuitry to determine one or more sidelink quality indicators
(Continued)

based on the received reference signal; and transmit circuitry to transmit the determined sidelink quality indicators to the eNB.

11 Claims, 15 Drawing Sheets

(51) Int. Cl.
| | |
|---|---|
| *H04W 72/12* | (2009.01) |
| *H04B 17/318* | (2015.01) |
| *H04W 28/04* | (2009.01) |
| *H04W 72/04* | (2009.01) |
| *H04W 72/08* | (2009.01) |
| *H04W 88/04* | (2009.01) |
| *H04L 1/18* | (2006.01) |
| *H04L 1/00* | (2006.01) |
| *H04W 92/10* | (2009.01) |
| *H04W 92/18* | (2009.01) |

(52) U.S. Cl.
CPC ..... *H04W 72/042* (2013.01); *H04W 72/0406* (2013.01); *H04W 72/085* (2013.01); *H04W 72/1231* (2013.01); *H04W 72/1268* (2013.01); *H04W 72/1278* (2013.01); *H04W 72/1284* (2013.01); *H04W 76/14* (2018.02); *H04L 1/1854* (2013.01); *H04L 1/1887* (2013.01); *H04L 2001/0097* (2013.01); *H04W 88/04* (2013.01); *H04W 92/10* (2013.01); *H04W 92/18* (2013.01)

(58) Field of Classification Search
CPC ............ H04W 40/22; H04W 72/0406; H04W 72/042; H04W 72/085; H04W 72/1231; H04W 72/1268; H04W 72/1278; H04W 72/1284; H04W 76/14; H04W 88/04; H04W 92/10; H04W 92/18
See application file for complete search history.

(56) References Cited

U.S. PATENT DOCUMENTS

| | | | |
|---|---|---|---|
| 2015/0043398 A1* | 2/2015 | Fwu | H04W 4/70 370/280 |
| 2016/0135239 A1* | 5/2016 | Khoryaev | H04W 76/14 370/329 |
| 2018/0206176 A1* | 7/2018 | Panteleev | H04W 76/14 |

OTHER PUBLICATIONS

3GPP TR 23.703 V1.1.0 (Jan. 2014); "Technical Specification Group Services and System Aspects; Study on architecture enhancements to support Proximity-based Services (ProSe) (Release 12)," 324 pages.
3GPP TS 23.303 V12.2.0 (Sep. 2014); "Technical Specification Group Services and System Aspects; Proximity-based services (ProSe); Stage 2 (Release 12)," 61 pages.

* cited by examiner

METHODS TO ENABLE HIGH DATA RATE RELAY OPERATION USING D2D AIR-INTERFACE

CROSS REFERENCE TO RELATED APPLICATIONS

The present application is a national phase entry under 35 U.S.C. § 371 of International Application No. PCT/US2015/000273, filed Dec. 23, 2015, entitled "METHODS TO ENABLE HIGH DATA RATE RELAY OPERATION USING D2D AIR-INTERFACE", which claims priority to U.S. Provisional Patent Application No. 62/204,227, filed Aug. 12, 2015, entitled "METHODS TO ENABLE HIGH DATA RATE RELAY OPERATION USING D2D AIR-INTERFACE", the entire disclosures of which are hereby incorporated by reference in their entireties.

TECHNICAL FIELD

Embodiments described herein generally relate to the field of wireless communications and, more particularly, to methods and apparatus for facilitating high data rate relaying in a wireless communication system.

BACKGROUND

It is becoming more important to be able to provide telecommunication services to fixed and mobile subscribers as efficient and inexpensively as possible. Further, the increased use of mobile applications has resulted in much focus on developing wireless systems capable of delivering large amounts of data at high speed.

Currently, as part of the Proximity Services (ProSe) capability introduced in Release 13 of the LTE Standards, a basic level of functionality has been described to allow network-to-UE relaying, specifically targeting Public Safety use cases. This functionality relies on the reuse of a sidelink radio communication channel between devices to route traffic at the IP layer.

However, relaying of data at the IP layer may suffer poor performance and may limit the data rates attainable.

BRIEF DESCRIPTION OF THE DRAWING

Aspects, features and advantages of embodiments of the present invention will become apparent from the following description of the invention in reference to the appended drawings in which like numerals denote like elements and in which.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the disclosure. However, it will be apparent to those skilled in the art having the benefit of the present disclosure that the various aspects of the embodiments may be practiced in other examples that depart from these specific details. In certain instances, descriptions of well-known devices, circuits, and methods are omitted so as not to obscure the description of the present disclosure with unnecessary detail.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

The following inventive embodiments may be used in a variety of applications including transmitters and receivers of a radio system, although the present invention is not limited in this respect. Radio systems specifically included within the scope of the present invention include, but are not limited to, network interface cards (NICs), network adaptors, fixed or mobile client devices, relays, base stations, femtocells, gateways, bridges, hubs, routers, access points, or other network devices. Further, the radio systems within the scope of the invention may be implemented in cellular radiotelephone systems, satellite systems, two-way radio systems as well as computing devices including such radio systems including personal computers (PCs), tablets and related peripherals, personal digital assistants (PDAs), personal computing accessories, hand-held communication devices and all systems which may be related in nature and to which the principles of the inventive embodiments could be suitably applied.

Figure 1:
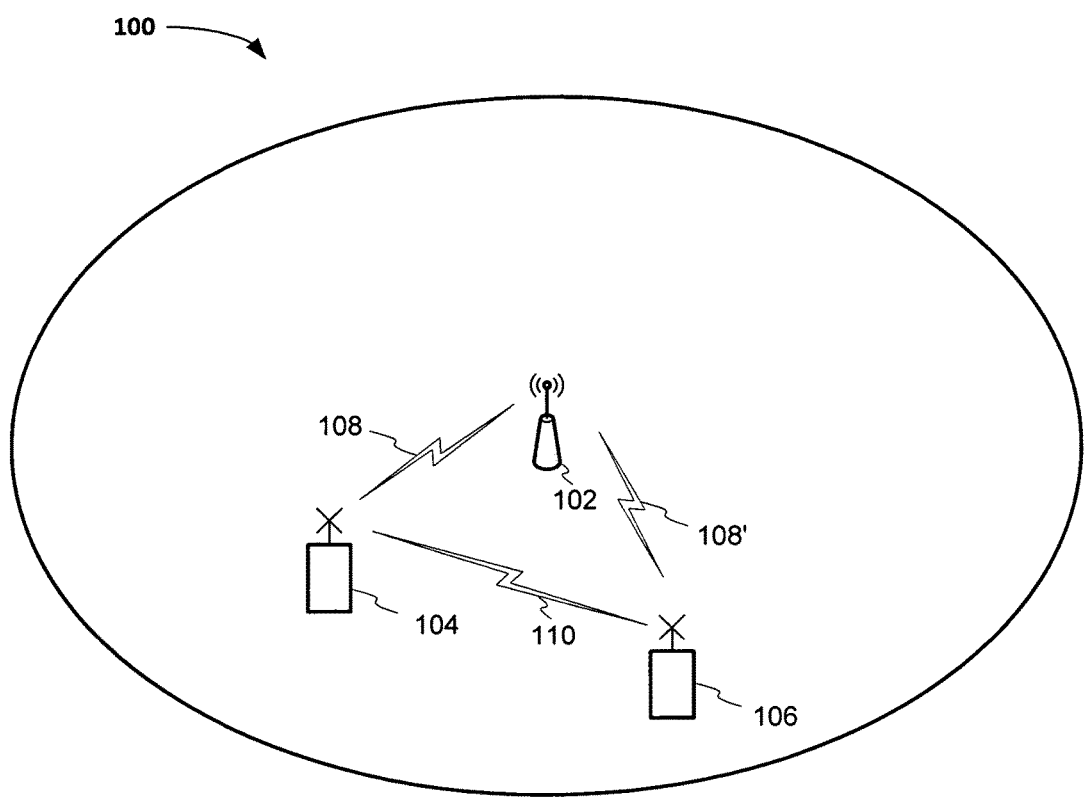
FIG. 1 is diagram of an example wireless network according to various embodiments.

FIG. 1 schematically illustrates a wireless communication network 100 in accordance with various embodiments. Wireless communication network 100 (hereinafter "network 100") may be an access network of a 3rd Generation Partnership Project (3GPP) long-term evolution (LTE) or long-term evolution-advanced (LTE-A) network such as an evolved universal mobile telecommunication system (UMTS) terrestrial radio access network (E-UTRAN).

The network 100 may include a base station, e.g., evolved node base station (eNB) 102, configured to wirelessly communicate with one or more mobile device(s) or terminal(s), e.g., first and second user equipment (UE) 104, 106. In various embodiments, the eNB 102 may be a fixed station (e.g., a fixed node) or a mobile station/node.

In various embodiments, the first UE 104 may be able to provide relaying functionality to forward data received from the eNB 102 to the second, remote, UE 106. Relay UE 108 communicates with the eNB 102 via a traditional Uu air interface 108, and with remote UE 106 via a sidelink interface 110. Remote UE 106 may also be able to communicate directly with the eNB 102 via Uu interface 108'.

LTE Release 13 introduces basic functionality to enable network-to-UE (NW-to-UE) relaying targeting Public Safety use cases. This relaying reuses a Sidelink radio communication interface defined in LTE Rel.12 between devices and routes the traffic through higher layers (IP layer) with minimal if any optimizations to L1 and L2. However, such IP-layer relaying and routing may suffer poor performance for the following reasons.

Relatively large latency of relay communication;
Only higher layer ARQ operation;
No channel quality reporting and adaptation on L1/L2 for UE-UE link;
Limited sidelink data rate due to 4 blind retransmissions; and
No TX-RX, TX-TX, RX-RX concurrency handling between data/control flows. For example, in legacy networks, a relay UE may need to acknowledge its DL reception by sending ACK/NACK in UL spectrum, which may collide with transmission on a Relay-to-UE link.

According to some embodiments, the LTE Rel.13 sidelink functionality may be enhanced in order to achieve higher data rate relaying under eNodeB (eNB) control.

According to some embodiments, further enhancements to control and scheduling of the sidelink air-interface may be also used for network optimization and have potential to improve user experience and increase the amount of services that can be provided. One of the more general use cases to which device-to-device (D2D) operation may be targeted is traffic management/offloading and utilization of its inherent multi-connectivity properties. Empowering sidelink air-interface and exploiting the new dimension of connectivity may bring additional benefits to mobile broadband and machine type communication (MTC) applications, establishing principles of underlay network operation.

Advanced relaying capability for UEs that are in coverage with the network, as described below according to some embodiments, may facilitate improvements in network efficiency and other advantages. In some embodiments, the communication path may be switched dynamically (between direct and indirect links) and may also be able to support different paths for uplink and downlink directions. However, this flexible switching and asymmetric relay path selection may not be feasible with L3 routing, at the IP-Layer provided in Rel.13.

Various embodiments may assume that the remote UE 106 to be served by a relay path is in coverage of the eNB 102, and that the remote UE 106 is in connected mode, or has been in connected mode such that the UE context is available in the eNB 102. This means that signaling radio bearers (SRBs) and data radio bearers (DRBs) and security are established between the Remote UE 106 and the eNB 102, and also that an S1 connection is established between the Remote UE and the eNB, and also an S1 connection is established between eNB and core network (MME and S-GW). Furthermore, it may be assumed that the Relay UE 104 remains in coverage of the eNB 102 for the duration of the relaying operation.

Figure 2:
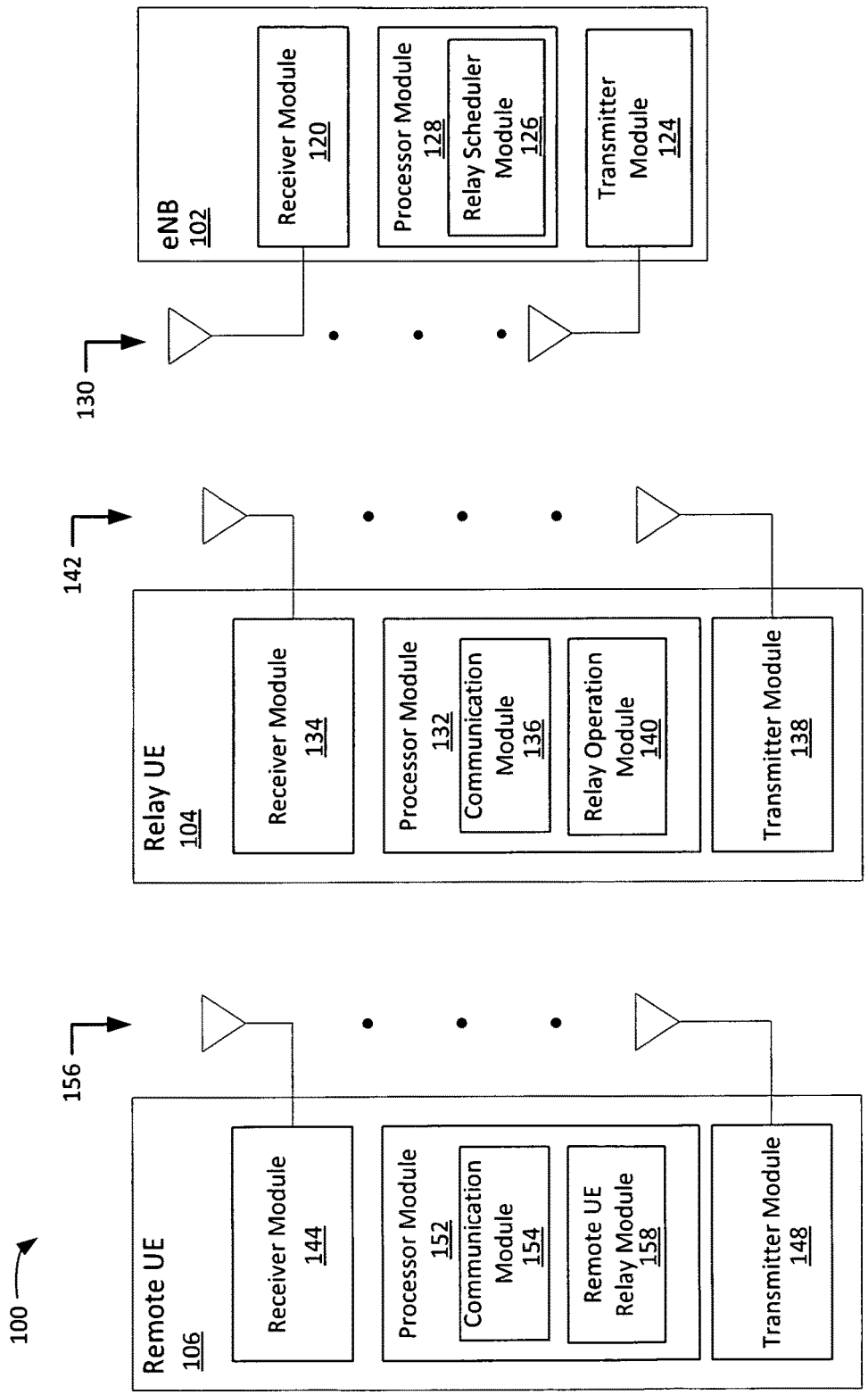
FIG. 2 is a block diagram schematically illustrating some components of the wireless communication network of FIG. 1.

FIG. 2 schematically illustrates some components of the wireless communication network 100 of FIG. 1 in greater detail and in accordance with various embodiments.

The eNB 102 may include a receiver module 120 with which to receive signals from Relay UE 104 and or Remote UE 106 via one or more antennas 130. eNB 102 may include a transmitter module 124 with which to transmit signals to Relay UE 104 or Remote UE 106 via one or more antennas 130. eNB 102 may also include a processor module 128 in communication with receiver module 120 and transmitter module 124 and configured to encode and decode information communicated by the signals. Processor module 128 also includes a relay scheduler module 126 to facilitate communication with the remote UE 106 using a relay path via a sidelink interface between the relay UE 104 and the remote UE 106.

In various embodiments, the relay UE 104, remote UE 106 and/or the eNB 104 may include a plurality of antennas 142, 156, 130 to implement a multiple-input-multiple-output (MIMO) transmission system, which may operate in a variety of MIMO modes, including single-user MIMO (SU-MIMO), multi-user MIMO (MU-MIMO), close loop MIMO, open loop MIMO or variations of smart antenna processing.

In various embodiments, Relay UE 104 comprises a transmitter module 138 for transmitting signals to eNB 104 and/or remote UE 106 and a receiver module 134 for receiving signals from the eNB 104 and/or remote UE 106. Relay UE 106 further comprises a processor module 132 coupled between the receiver module 134 and the transmitter module 138 and including a communication module 136 to encode and decode information communicated by the signals. Processor module 132 also includes relay operation module 140 to facilitate operation of the relay UE 104 in relaying communications to the Remote UE 106.

In various embodiments, Remote UE 106 comprises a transmitter module 148 for transmitting signals to eNB 104 and/or relay UE 104 and a receiver module 144 for receiving signals from the eNB 104 and/or relay UE 104. UE 108 further comprises a processor module 152 coupled between a receiver module 144 and a transmitter module 148 and including a communication module 154 to encode and decode information communicated by the signals. Processor module 152 also includes remote UE relay module 158 to facilitate relay communication with the eNB 102 by the UE 108.

While the Relay UE 104 and Remote UE 106 have been illustrated in FIG. 2 as distinct devices, in some embodiments UEs may be provided with functionality to act as either a relay UE or a remote UE. For example, a single UE may be provided with both a relay operation module 140 and a remote UE relay module 158. Depending on the situation, for example the relative position and signal strengths of UEs within the network, a UE may then operate as either a Relay UE or a Remote UE as required.

Figure 3:
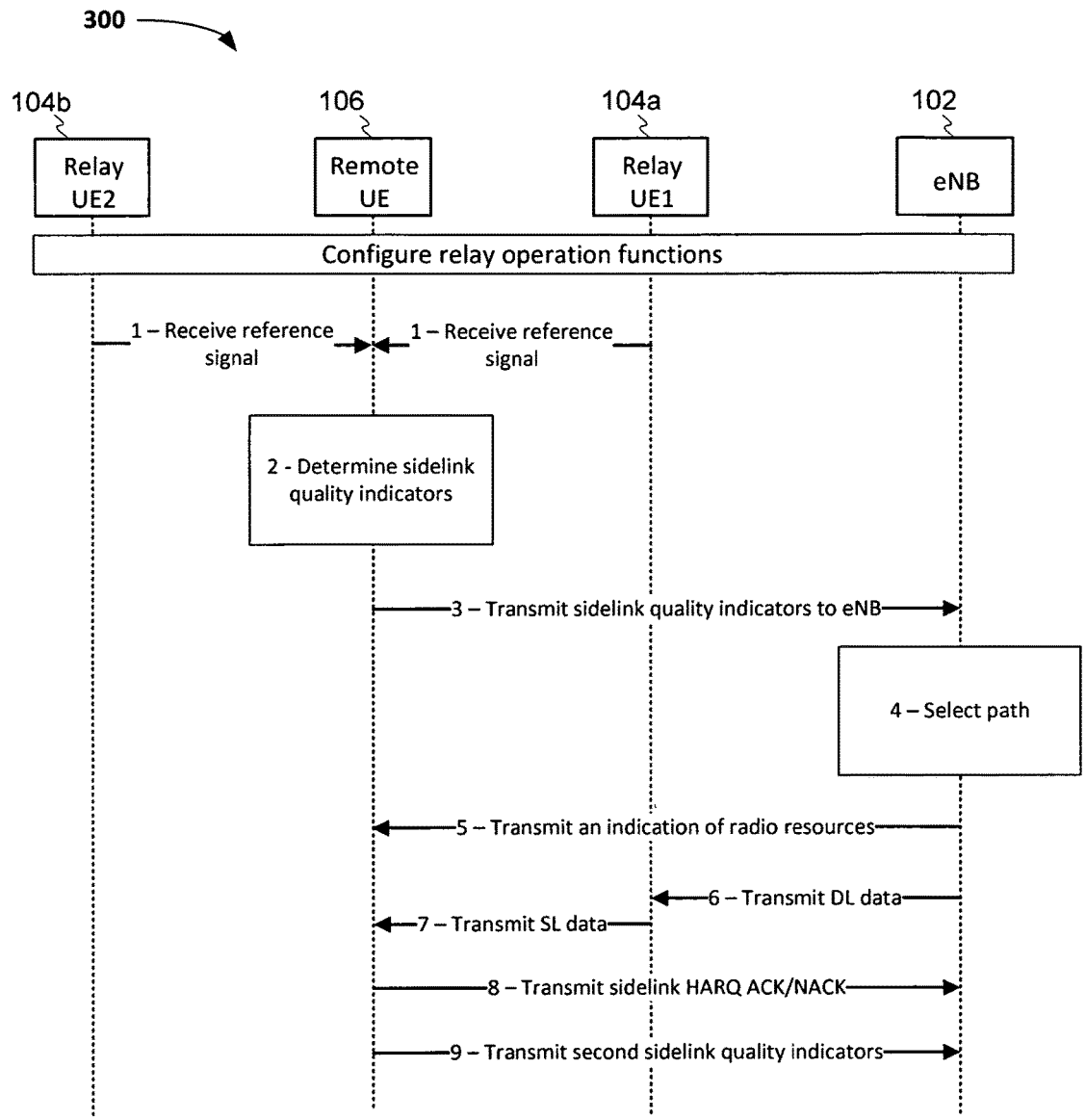
FIG. 3 is a sequence diagram illustrating a method for implementing relay communications according to some embodiments.

FIG. 3 illustrates an exemplary method 300, in the form of a sequence diagram, for implementing relay communication between an eNB 102 and a remote UE 106 via a relay UE 104 in a wireless communication system. For simplicity, only DL relay offloading scenario is shown, however similar diagram may be illustrated for the UL case. FIG. 3 illustrates the signaling involved between the remote UE 106, relay UE 104 and eNB 102 when identifying and selecting a relay path. The elements of the sequence following the network being configured for relay operation are described below:

1—The Remote UE 106 receives reference signals from a first relay UE 104a and a second relay UE 104b via the sidelink interface;
2—The Remote UE 106 processes the received reference signals to determine one or more sidelink quality indicators;
3—The determined sidelink quality indicators are then transmitted to an eNB 102;
4—The eNB 102 selects a path to use for communicating with the Remote UE 106 based on the received sidelink quality indicators. The selected path may be via one of the Relay UEs 104a, 104b, or may be a direct path;
5—The eNB 102 transmits an indication of radio resources to be used by the Remote UE 106 to communicate with the eNB 102. The indicated radio resources may be on a sidelink interface between the remote UE 106 and one of the relay UEs in the case that a relay path is selected;
6—For a relay path via first Relay UE 104a, the eNB 102 may transmit downlink (DL) data to the first relay UE 104a;
7—The first relay UE 104a may then transmit the data to the remote UE 106 via the sidelink interface for reception by the remote UE using the indicated radio resources;
8—The remote UE 106 may then transmit HARQ ACK/NACKs for the received data back to the eNB 102; and
9—The remote UE 106 may transmit further sidelink quality indicators for the active sidelink communication channel.

Figure 4:
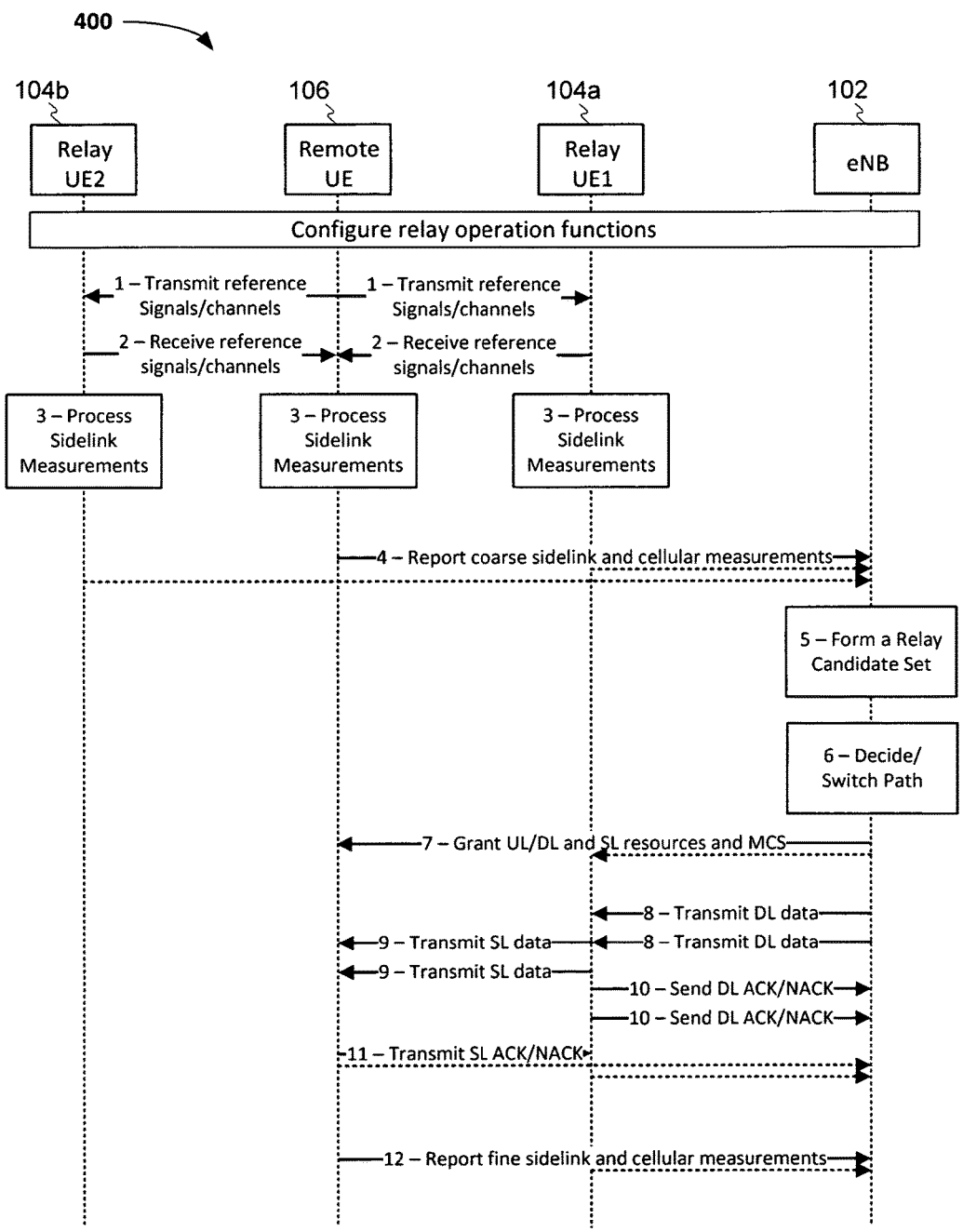
FIG. 4 is a sequence diagram illustrating a more general method for implementing relay communications according to some embodiments.

FIG. 4 illustrates a further exemplary method 400, in the form of a sequence diagram, for implementing relay communication between an eNB 102 and a remote UE 106 via a relay UE 104 in a wireless communication system, similar to that of FIG. 3. For simplicity, only DL relay offloading scenario is shown, however similar diagram may be illustrated for the UL case. The method illustrated in FIG. 4 illustrates a number of potential variations on the method of FIG. 3. The elements of the sequence following the network being configured for relay operation are described below:

1—The Remote UE 106 transmits reference signals on the sidelink interface to the first and second relay UEs 104a, 104b;
2—The Remote UE 106 receives reference signals from the first relay UE 104a and the second relay UE 104b via the sidelink interface;
3—The Remote UE 106 and first and second relay UEs 104a, 104b processes the received reference signals to determine one or more sidelink quality indicators;
4—The determined sidelink quality indicators are then transmitted, along with similar measurements on the cellular signal received from the eNB 102 to eNB 102 by first and second Relay UEs 104a, 104b and Remote UE 106;
5—The eNB 102 selects one or more Relay UEs to form a relay candidate set comprising Relay UEs that may be used to provide a relay path to the remote UE 106;
6—The eNB 102 selects a path to use for communicating with the Remote UE 106 based on the received sidelink quality indicators. The selected path may be via one of the Relay UEs of the relay candidate set, or may be a direct path;
7—The eNB 102 transmits an indication of uplink (UL), downlink (DL) and/or sidelink (SL) radio resources to be used by the Remote UE 106 and/or Relay UEs to communicate with the eNB 102. The indicated radio resources may be on a sidelink interface between the remote UE 106 and one of the relay UEs in the case that a relay path is selected;
8—For a relay path via first Relay UE 104a, the eNB 102 may transmit downlink (DL) data to the first relay UE 104a;
9—The first relay UE 104a may then transmit the data to the remote UE 106 via the sidelink interface for reception by the remote UE using the indicated radio resources;

10—First Relay UE 104*a* may transmit HARQ acknowledgements for the downlink data received from the eNB 102 to be relayed to the Remote UE 106;

11—The remote UE 106 may then transmit sidelink HARQ ACK/NACKs for the received data back to the eNB 102 and/or first relay UE 104*a*; and 12—The remote UE 106 and/or active relay UE 104*a* may transmit further sidelink quality indicators for the active sidelink communication channel In embodiments, the technology components to enable enhanced relay operation outlined in FIGS. 3 and 4 above based on LTE technology and sidelink air-interface are described. According to some embodiments, these technology components include the following.

1. Optimized Relaying with L1/L2 support
Radio-aware Candidate Relay Set selection/reselection
Enhanced sidelink measurements/procedures
Fast path switching
Coordinated and eNB controlled resource allocation & relay selection criteria
2. Enhanced Sidelink (SL) Unicast Operation
Increased sidelink data rate
Sidelink power control
Sidelink HARQ
Sidelink CQI/CSI measurements and reporting
3. Network Control Signalling Enhancements
Resource allocation/alignment among eNB/Relay UE/Remote UE for both transmission and reception
Optimized cellular HARQ operation The legacy Rel.12-13 sidelink framework may enable IP-layer relay operation focusing on partial coverage scenarios when some UEs do not have connection to an eNB. The data rate and latency of this relay operation may be limited and thus the benefits of using relaying for traffic management are unclear.

According to some embodiments, mechanisms are disclosed herein that may improve the LTE Rel.13 sidelink functionality in order to achieve high data rate relaying.

In embodiments, UE functions are enhanced and are used to enable high data rate relay operation for optimization of network performance.

The following terms may be used in this disclosure:

Target UE (or Remote UE)—A UE with DL and/or UL traffic which may be offloaded to indirect/relay path.

Cellular (or Direct) path—A legacy cellular data path with one-hop data transmission to/from Target UE.

Relay (or Indirect) path—A relay two-hop path using DL/UL and/or SL transmissions.

Relay Candidate Set (RCS)—A set of UEs, which are selected, based on radio-aware measurements as candidate nodes to relay the traffic of target UE's.

Relay UE—A UE, which is selected from the RCS to serve as a relay.

Coarse link quality measurements (long term)—received signal received (RSRP)/reference signal received quality (RSRQ)/reference signal strength indicator (RSSI) measurements on cellular link or sidelink that may be used to make decision on selection/reselection of relay candidates and switch paths. The periodicity may be in the order of several radio frames.

Fine link quality measurements (short term)—channel quality indicator (CQI/channel state information (CSI)/rank indicator (RI) measurements done with medium periodicity and used for link adaptation and path selection.

According to some embodiments, the relay offloading operation may include the following aspects:

Fast DL Path Switching/Scheduling.
Fast UL Path Switching/Scheduling.
Ways to Increase Sidelink Data Rate.
Enhanced Sidelink Power Control.
Sidelink HARQ Report.
Optimized Cellular HARQ Operation.

In some embodiments described below, it is assumed that the Relay Candidate Set may be already have been discovered and may be configured based on reports of coarse radio measurements from the Remote UE 106 and/or Relay UEs 104*a*, 104*b*.

DL Fast Path Switching/Scheduling

In some embodiments, to allow fast path switching (either direct path to/from a relay path or relay path to relay path), a physical control channel (either physical downlink control channel (PDCCH), physical sidelink control channel (PSCCH) or both) may be used to configure the resources and transmission/reception parameters for relay and target UE. In some embodiments, the legacy cellular path may be scheduled using conventional DCI format via (e)PDCCH. In embodiments, several alternatives may be implemented, including but not limited to the alternatives discussed below in conjunction with FIGS. 5*a* to 5*c*.

Figure 5A:
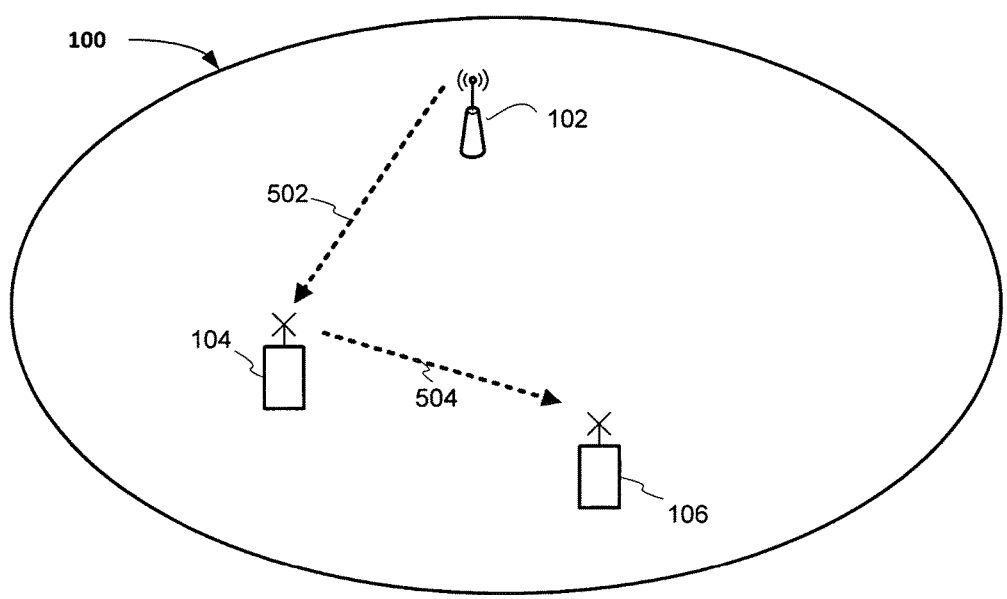
FIG. 5a illustrates a communication path for distributing control information for downlink data according to some embodiments.

FIG. 5*a* illustrates a communication path by which an eNB 102 can provide an indication of radio resources to be used to provide a downlink path to the remote UE 106. According to the arrangement of FIG. 5*a* a Remote UE 106 may monitor both the DL control channel 502 and SL control channel 504. In this case, the remote UE 106 may monitor downlink control information (DCI) for direct data and sidelink control information (SCI) for the forwarded data. The path switching may be transparent for the remote UE 106. In the case that the relay path is activated, the remote UE 106 may report sidelink CQI (SL-CQI) of the activated sidelink path while it may also report SL-RSRP/SL-RSRQ/SL-RSSI for relay UEs in the relay candidate set. In the case that a Remote UE 106 received both SL and DL grants, then the data may be received through an aggregated SL+DL path.

Figure 5B:
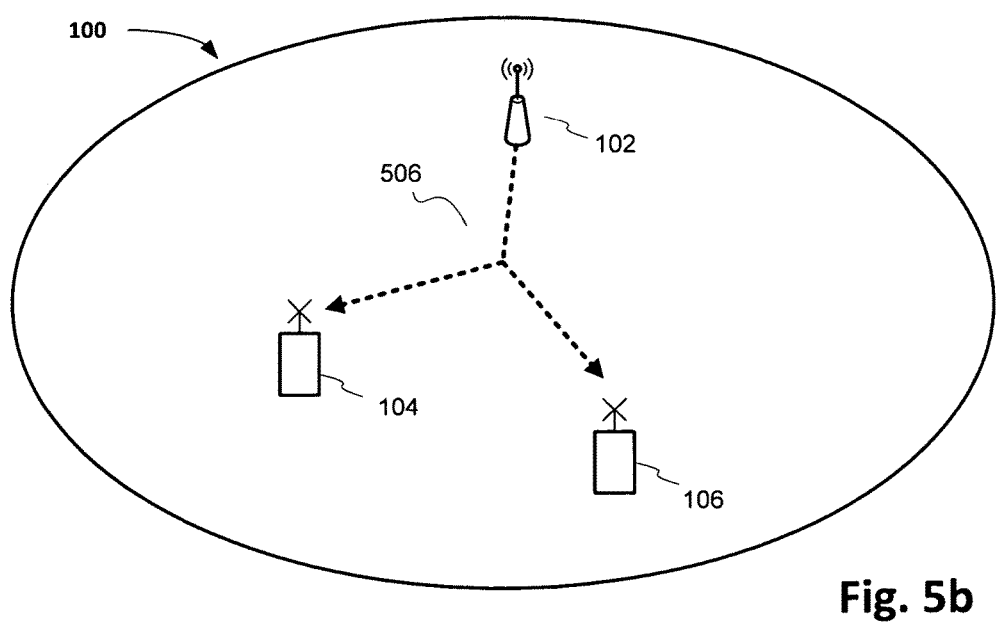
FIG. 5b illustrates an alternative communication path for distributing control information for downlink data according to some embodiments.

FIG. 5*b* illustrates a further communication path by which an eNB 102 can provide an indication of radio resources to be used to provide a downlink path to the remote UE 106. According to the arrangement of FIG. 5*b* the Remote UE 106 may monitor the downlink Control Channel 506 for both cellular and relay path scheduling. In this alternative, the downlink control information may contain information for both sidelink data transmission by the Relay UE 104 and sidelink data reception for the Target UE 106.

This option may be realized without using a PSCCH (Physical Sidelink Control Channel) channel. This may avoid introducing additional latency and overhead coupled with usage of PSCCH.

To enable reception of a single DCI grant by at least two UEs (the relay UE 104 and the remote UE 106), the UEs may be configured with a common/paired RNTI, e.g. SL-RLY-RNTI. The DCI in this case may be scrambled with this SL-RLY-RNTI. The modulation and coding scheme (MCS) index also may be signaled in the grant. In LTE Rel.12, the DCI Format 5 may not have an MCS field for dynamic scheduling of sidelink instantaneous data rate. Therefore, according to some embodiments a new DCI Format X may be introduced to incorporate at least MCS for the SL transmission/reception. The MCS index (5 bit) may be signaled instead of PSCCH resource index (6 bit) since PSCCH is not used in this case, i.e. not transmitted.

Figure 5C:
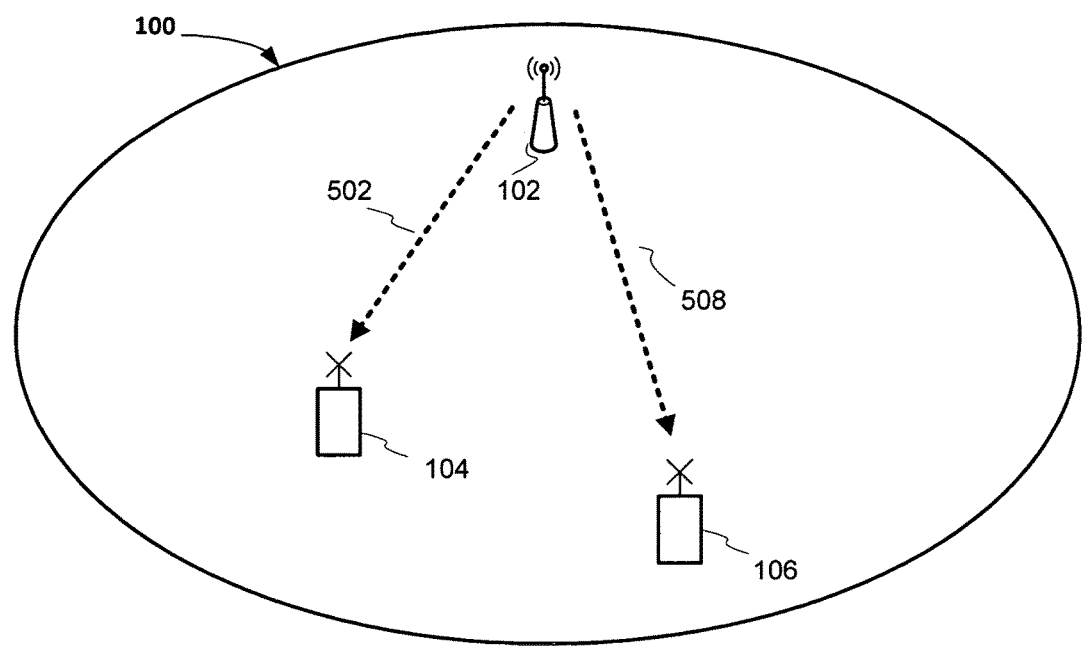
FIG. 5c illustrates a further alternative communication path for distributing control information for downlink data according to some embodiments.

FIG. 5*c* illustrates a further communication path by which an eNB 102 can provide an indication of radio resources to be used to provide a downlink path to the remote UE 106. According to the arrangement of FIG. 5*c* the Remote UE 106 may monitor the downlink control channel 405 for both cellular and relay path scheduling. Since a PSCCH does not need to be used for relay operation in this option, the eNB 102 may send a first DCI 502 to the relay UE 104 for transmission by Relay UE 104 on the sidelink interface and a second DCI 508 for reception by the Target UE 106.

One difference with the method illustrated in FIG. 5*b* may be that the eNB 102 may not configure a common/paired RNTI for the Target UE 106 and Relay UE 104; however, the control signaling overhead may be doubled for this alternative.

According to a further method, the Remote UE 106 may monitor an active path (either downlink or sidelink). In this case, information about switching to another path may be multiplexed into control/data of the currently active path (downlink or sidelink).

An advantage of this operation may be that the remote UE 106 may only require one receive chain or may switch off another receive chain for power saving. In some embodiments, the switching latency may be higher compared to the methods of FIGS. 5*a* to 5*c*.

UL Fast Path Switching/Scheduling

According to some embodiments, it is assumed that the Target UE 106 requests resources for uplink transmission by sending a buffer status report (BSR) and scheduling request (SR). After receiving the BSR, the eNB 102 may decide the path to be used for the data transmission (using available metrics and measurements for the relay candidate set (RCS) and/or from RCS) and may either allocate direct cellular UL resources to the Target UE 106 or schedule sidelink and uplink resources for the Target UE 106 and the Relay UE 104 respectively. In embodiments where the UL path may be switched to a relay one, one or more of the following alternatives discussed below in conjunction with FIGS. 6*a* to 6*d* be used.

Figure 6A:
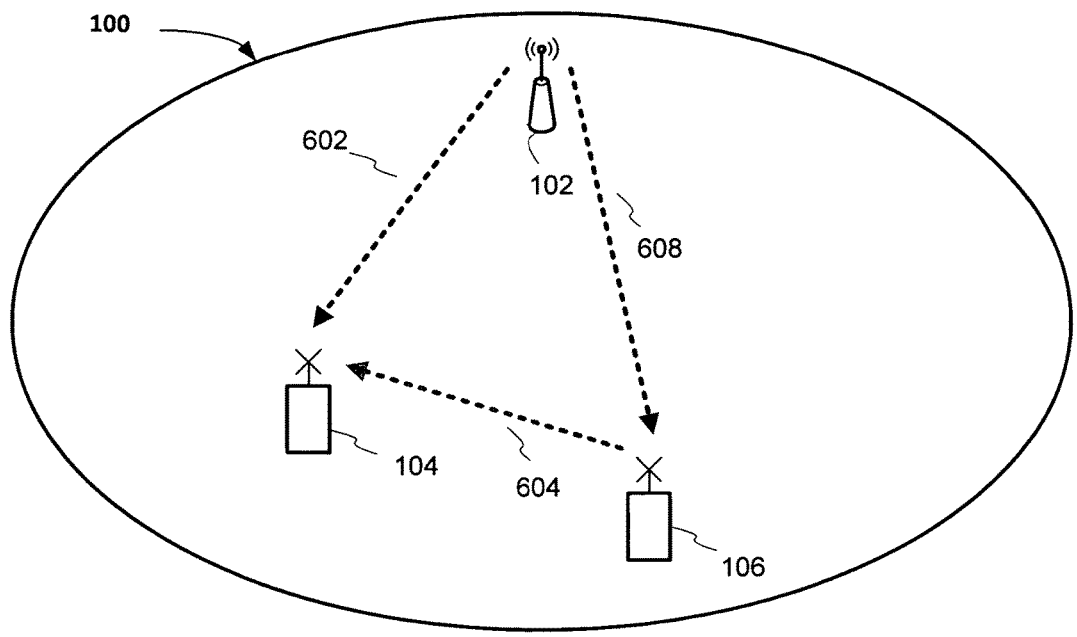
FIG. 6a illustrates a communication path for distributing control information for uplink data according to some embodiments.
Figure 6B:
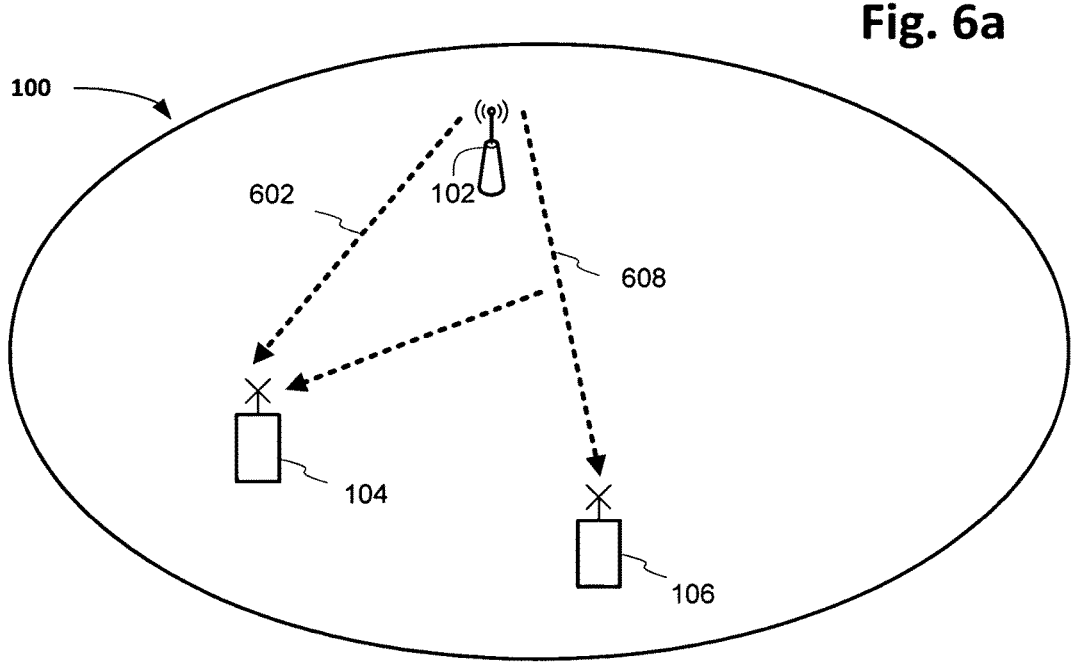
FIG. 6b illustrates an alternative communication path for distributing control information for uplink data according to some embodiments.

FIGS. 6*a* and 6*b* illustrates communication paths by which an eNB 102 can provide an indication of radio resources to be used to provide an uplink path for the remote UE 106. According to the arrangements of FIGS. 6*a* and 6*b* the eNB 102 may send a grant 608 for sidelink (SL) transmission to the Target UE 106 and may send a separate grant 602 for UL transmission to the relay UE 104. Once the relay UE 104 receives the SL data, the Relay may forward it using the already allocated UL resources.

This mechanism may reduce latency comparing to LTE Rel.13 relaying at the IP-layer by eliminating the stage of requesting resources for UL transmission by the relay UE 104 after it has received the data.

In particular, FIG. 6*a* illustrates an alternative in which the relay UE 104 may receive control information 604 for SL data reception from the SCI while monitoring PSCCH channel, i.e. the grant for sidelink transmission is transmitted by the eNB 102 via the remote UE 106.

FIG. 6*b* illustrates a further alternative in which the relay UE 104 may receive control information for SL data reception from the downlink control information 608 (DCI). A modified DCI format and new SL-RLY-RNTI may be needed for this option (this may be similar to the DL path scheduling illustrated on FIG. 5*b*). The PSCCH channel may not be needed in this case.

Figure 6C:
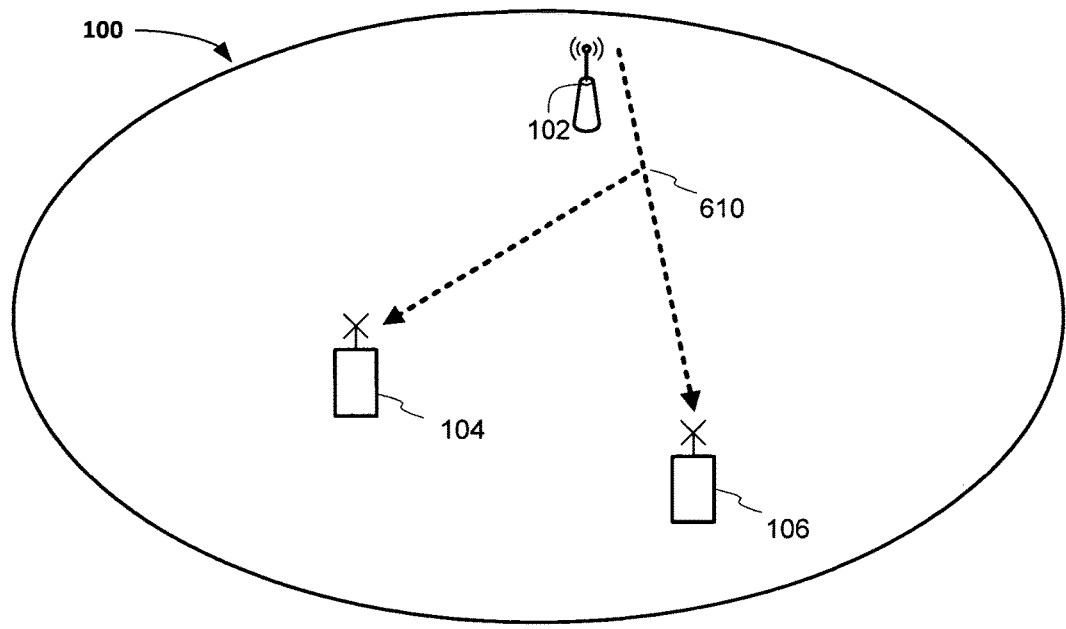
FIG. 6c illustrates a further alternative communication path for distributing control information for downlink data according to some embodiments.

FIG. 6*c* illustrates a further communication path by which an eNB 102 can provide an indication of radio resources to be used to provide an uplink path for the remote UE 106. According to the arrangement of FIG. 6*c* the eNB 102 may send a joint grant 610, which may schedule both SL transmission and reception (TX/RX) and also subsequent UL transmission by the relay UE 104.

According to some embodiments, the PSCCH channel may not be used in this case. The same mechanism of defining a common RNTI for both Relay and Target UE 104, 106 may be needed as for the alternative of FIG. 6*b*.

Additionally, according to some embodiments a rule to derive UL transmission resources and timing from the SL transmission resources may be defined, e.g. the UL transmission may happen at least T ms (e.g. T=4 ms) after the reception of the corresponding SL data. Another option may be to place an additional UL resource indication field to the joint DCI format.

Figure 6D:
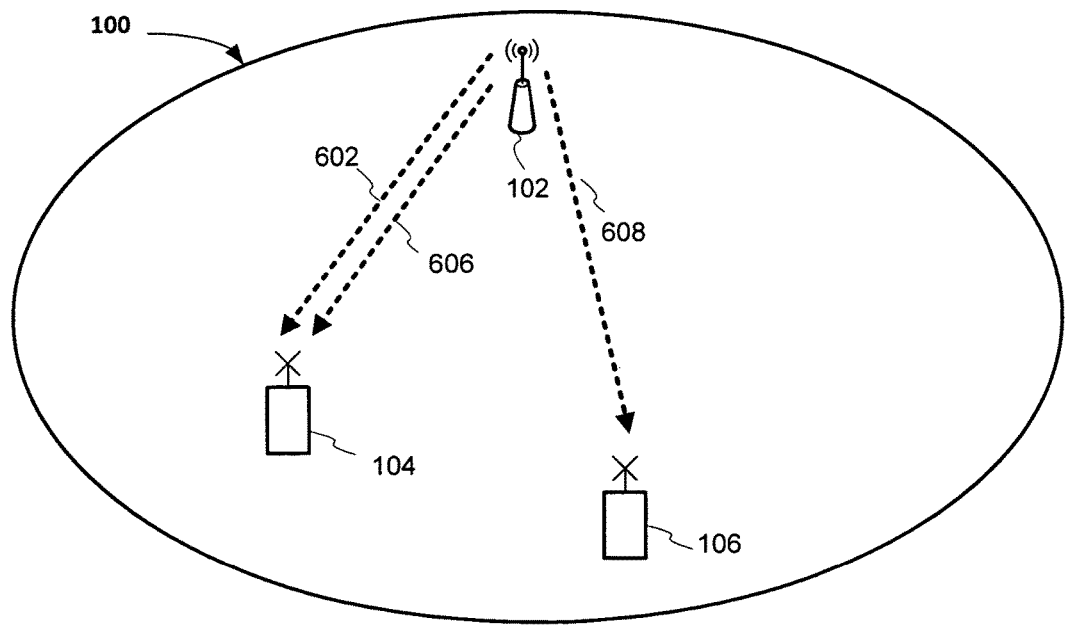
FIG. 6d illustrates a further alternative communication path for distributing control information for downlink data according to some embodiments.

FIG. 6*d* illustrates a further communication path by which an eNB 102 can provide an indication of radio resources to be used to provide an uplink path for the remote UE 106.

According to the arrangement of FIG. 6*d* some embodiments may achieve PSCCH-less operation by providing separate grants for SL TX 608, SL RX 606 and UL TX 602. In this case, a PSCCH transmission and a common RNTI may not be needed, but the control overhead may be higher than for other alternatives described above.

Increasing Sidelink Data Rate

The Rel.12-13 sidelink relay operation may have a limited data rate because of several restrictions and design assumptions. These restrictions may greatly limit potential usage of relay beyond Public Safety use cases of partial coverage operation. For example, the maximum SL data rate in Rel.12 may be limited to 25456/4(TTIs)/(0.001)~6.3 Mbit/s In some embodiments, enhancing the performance of SL link may extend relay usage for network optimization and traffic management. Embodiments may include one or more of the following:

Remove restriction on 16QAM modulation and enable higher order modulations, e.g. 64QAM or 256QAM. The legacy control signalling supports 5-bit MCS field, therefore there may be no change except the removing restriction to enable 64QAM.

Remove restriction on sidelink TBS size of 25456.

Enable subframe level transmission, i.e. remove blind 4 TTI transmission restriction and set it configurable from 1 to 4 through 8. The sidelink SCI and DCI may be modified accordingly to support a configurable number of retransmissions.

Increase amount of sidelink TX processes (e.g. up to 4).

Enable Rank-2 MIMO on sidelink. The reference signals and channel quality feedback may be enhanced in this case. E.g., the SL demodulation reference signals (DMRS) may be transmitted from different antenna ports with different cyclic shifts and/or orthogonal cover codes (OCC) in order to estimate the MIMO channel. The SL precoding matrix index (PMI) and/or rank indicator (RI) may be reported using a sidelink channel quality feedback. This information may be reported back to Relay UE and/or Remote UE and/or eNB.

For eNB controlled resource allocation Mode-1, the sidelink MCS index may be controllable by eNB inside D2D grant (DCI Format 5). The MCS index signalled semi-statically through higher layers or decided by a UE may substantially limit eNB control of relay operation.

Multiplexing of Data and SCI at TTI level may be used for fast SL scheduling and less PSCCH overhead.

Enhanced Sidelink Power Control

According to some embodiments, the D2D power control may be modified for the optimized relay operation. In some embodiments, the Rel.12 sidelink power control mechanism may be reused where transmission power may be determined using dedicated SL power control (PC) parameters and UE to eNB pathloss value. This option may be possible because of broadcast nature of Rel.12 sidelink. However, for the relay operation it may not be optimal.

In some embodiments, the sidelink power control may be modified in order to use remote UE 106 to relay UE 104 pathloss measurements for setting transmission power. For example the below equation may be used to determine sidelink transmission power:

$$SL\ TX\ \text{power}=\min(\text{Cellular}\ TX\ \text{power}-\text{offset}, SL\ \text{Link}\ TX\ \text{power})$$

i.e. the sidelink transmission power may be set to a minimum of the cellular transmit power minus an offset and a sidelink transmit power based on compensation of the relay UE to remote UE pathloss and the open loop control parameters P0 and alpha.

This modification may lead to more effective usage of UE transmit power in case of short-range communication and may improve the overall interference environment. The offset relative to UL transmission power may be set in order to protect intra- and inter-cell UL transmissions.

In some embodiments, different SL power control settings (e.g. P0 and alpha) for Relay UEs 104 and Remote UEs 106 may be set. Additionally, transmit power control adjustment commands similar to TPC commands in UL may be introduced for fast power adjustment for link adaptation and interference management.

Moreover, the power control parameters may be configured separately for UL relay and DL relay because of different interference environment.

Sidelink HARQ Report

To further optimize relay operation, according to some embodiments the data transmission over relay path may implement HARQ acknowledgments. In legacy networks, Rel.12-13 sidelink operation lacks ACK/NACK and HARQ on the physical layer due to the broadcast nature of the sidelink PHY. In some embodiments, ACK/NACK may be sent in various ways in the case of enhanced relay operation.

Sidelink Feedback—DL HARQ Report

For the DL forwarding case, where data is transmitted via a relay UE 104, there may be two consecutive stages of the data path: 1) eNB 102 to Relay UE 104, and 2) Relay UE 104 to Target UE 106.

On the first stage from the eNB 102 to the Relay UE 104, legacy HARQ ACK/NACKs may be sent as in usual DL operation. According to some embodiments some modifications to the legacy HARQ mechanism may be provided to enable high data rate relaying, as discussed further below.

If a first-hop transmission is successful, then the data may be transmitted in the second hop between the Relay UE 104 and the remote UE 106. On the second stage, the ACK/NACK may be sent according to one of the options outlined below with reference to FIGS. 7a to 7d.

Figure 7A:
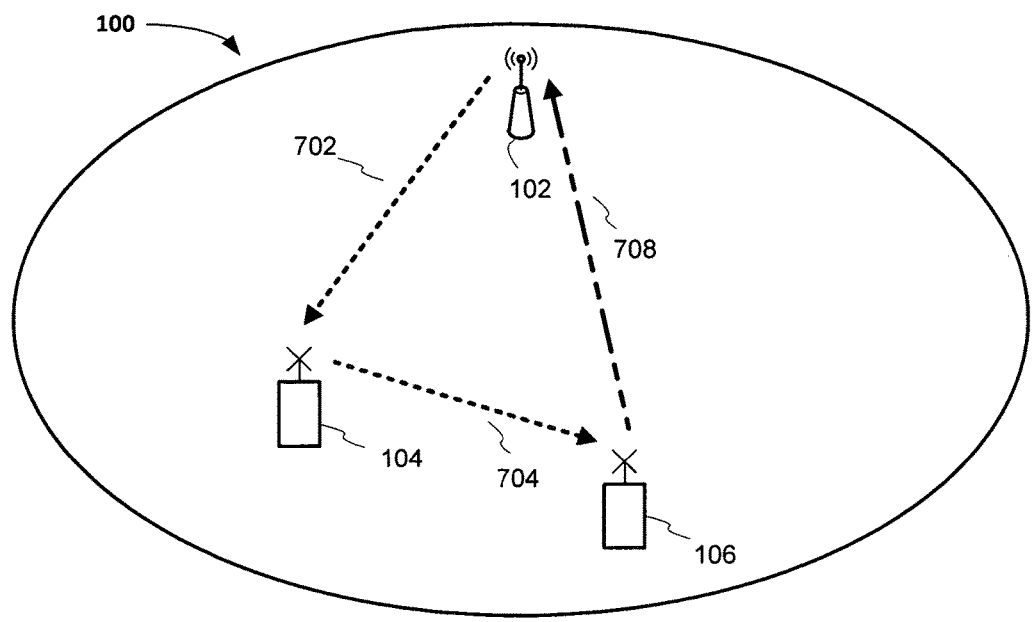
FIG. 7a illustrates a communication path for communicating HARQ feedback information for downlink data received via a relay by a remote UE path according to some embodiments.

FIG. 7a illustrates a communication path by which HARQ ACK/NACKs may be sent to the eNB 102 by the remote UE 106. According to the arrangement of FIG. 7a the HARQ ACK/NACK may be sent to eNB 708 (Reported by Remote UE directly to eNB 102 in PUSCH/PUCCH). This option may be possible when the Relay UE 104 does not do any data reordering, segmentation and multiplexing and just repeats the received data in the SL. In case of NACK, the data may be resent on both hops 702, 704.

Figure 7B:
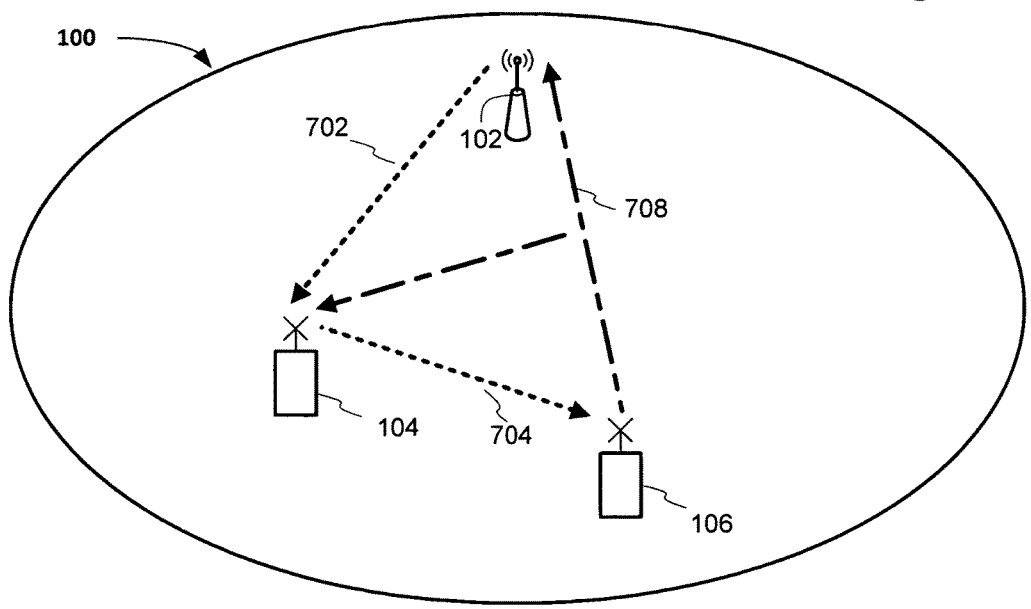
FIG. 7b illustrates an alternative communication path for communicating HARQ feedback information for downlink data received by a remote UE via a relay path according to some embodiments.
Figure 7C:
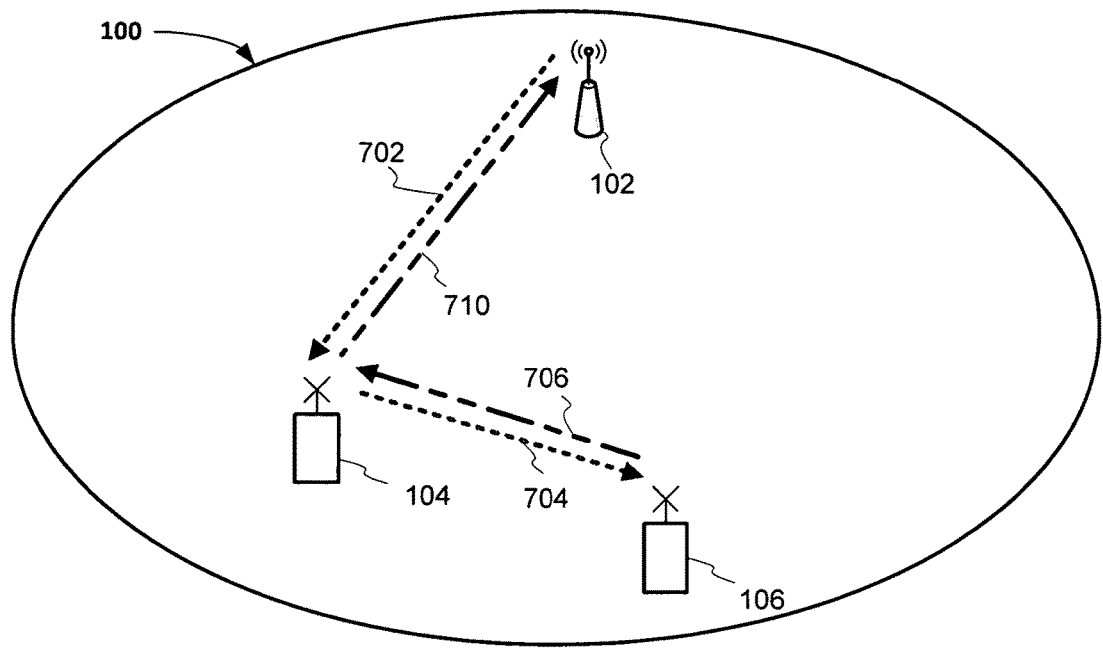
FIG. 7c illustrates a further alternative communication path for communicating HARQ feedback information for downlink data received by a remote UE via a relay path according to some embodiments.
Figure 7D:
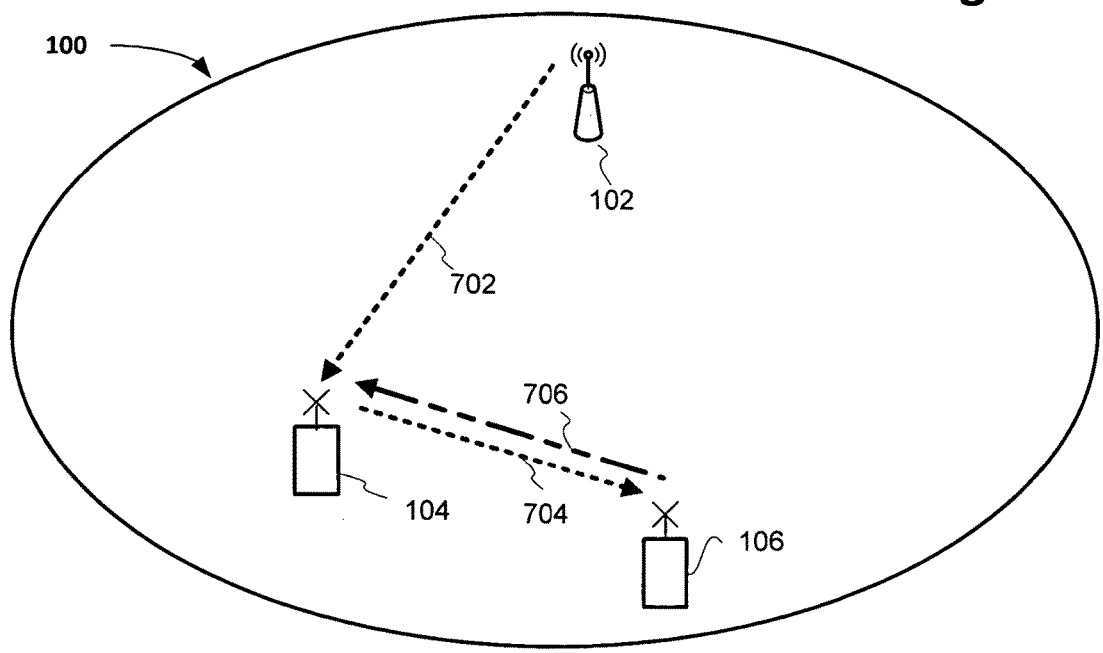
FIG. 7d illustrates a further alternative communication path for communicating HARQ feedback information for downlink data received by a remote UE via a relay path according to some embodiments.

FIG. 7b-7d illustrates further communication paths by which HARQ ACK/NACKs may be sent to the eNB 102 by the remote UE 106. According to the arrangements of FIG. 7b-7d the HARQ ACK/NACK may be sent to both eNB 102 and Relay UE 104. According to some embodiments, this may be achieved in a number of different ways.

According to the arrangement of FIG. 7b the ACK/NACK 708 may be sent using PUCCH or PUSCH to the eNB 102 and overheard by the Relay UE 104. In this case, the Relay UE 104 may be aware of UL transmission parameters and scrambling sequences of the remote. Alternatively, the ACK/NACK 708 may be sent to the Relay UE 104 and overheard by the eNB 102. This option may be similar to the above described option of using the PUCCH or PUSCH, but the sidelink physical structure may be used for transmission.

According to the arrangement of FIG. 7c the HARQ ACK/NACK may be sent in two stages: 1) To the Relay UE 706, 2) Forwarded by Relay UE 710. In this case, the transmission may be acknowledged on both hops and on overall path. This option also may requires introduction of a new sidelink HARQ channel. It is also may be suitable for any Relay behavior in terms of data reordering, segmentation and multiplexing.

According to the arrangement of FIG. 7d the HARQ ACK/NACK 706 may be sent to the Relay UE only. L1/L2 HARQ processes on cellular hop and sidelink hop may be decoupled. The new sidelink HARQ channel may be required.

Sidelink Feedback—UL HARQ Report

An UL relay path may include the following two stages: 1) Transmission 804 of data on sidelink channel to a Relay UE 104, and 2) Forwarding 802 the data on the uplink from the relay UE 104 to the eNB 102. The second hop 802 (Relay UE 104 to eNB 102) may be acknowledged using the legacy UL HARQ operation. According to some embodiments, for the first hop 804 and overall two-hop relay path, the following options illustrated in FIGS. 8a to 8d may be used.

Figure 8A:
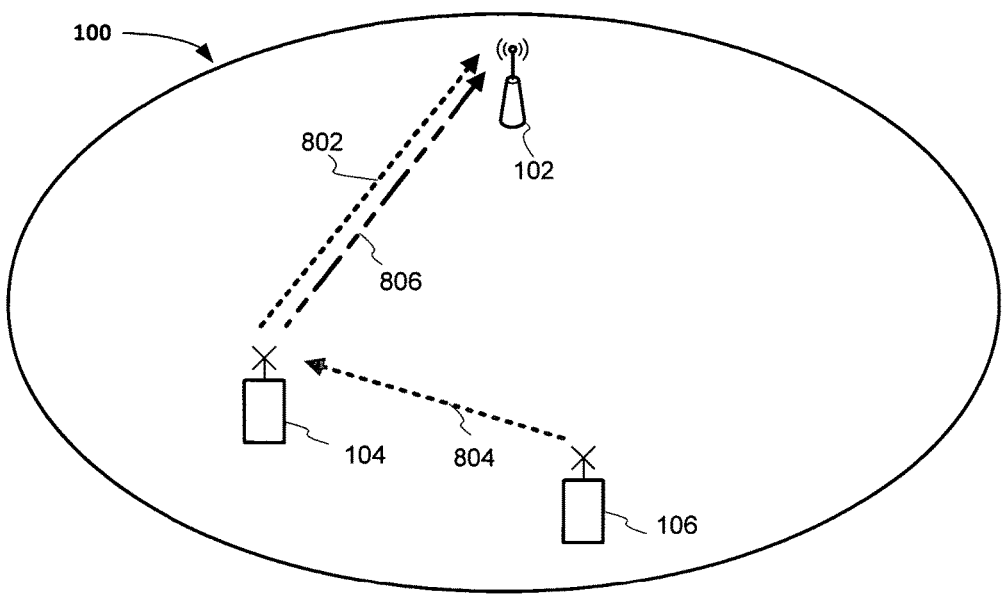
FIG. 8a illustrates a communication path for communicating HARQ feedback information for uplink data transmitted by a remote UE via a relay path according to some embodiments.

FIG. 8a illustrates a communication path by which HARQ ACK/NACKs may be sent in response to transmissions by the remote UE 106. According to the arrangement of FIG. 8a the ACK/NACK 806 on the sidelink may be sent to the eNB 102 (Reported by Relay UE 104—e.g. multiplexed with PUSCH over Uu). This option may be possible if there is no data reordering/segmentation/multiplexing on sidelink. In this case, if NACK is received, then eNB 102 may grant additional resources with indication of retransmission.

Figure 8B:
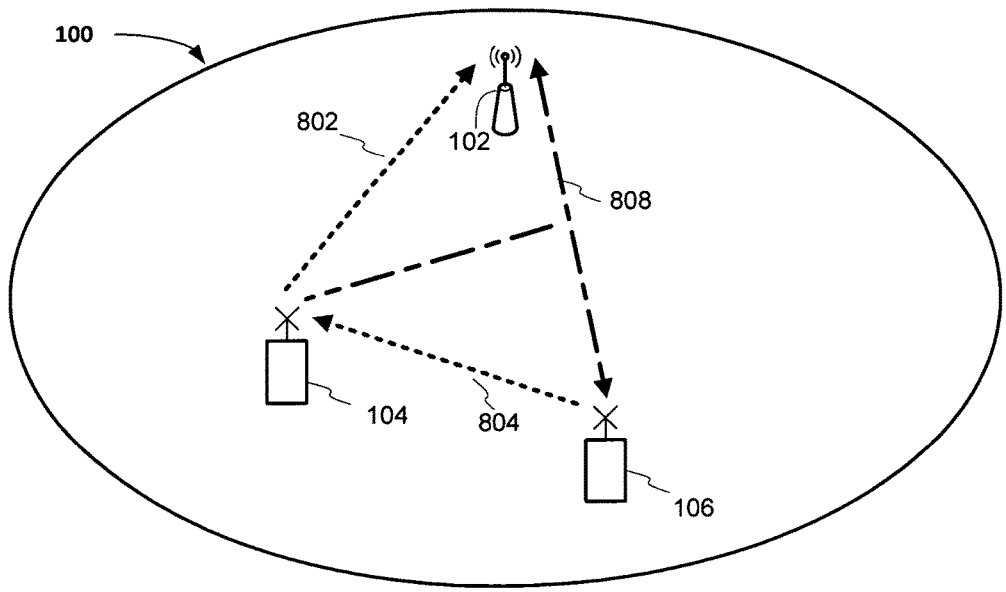
FIG. 8b illustrates an alternative communication path for communicating HARQ feedback information for uplink data transmitted by a remote UE via a relay path according to some embodiments.
Figure 8C:
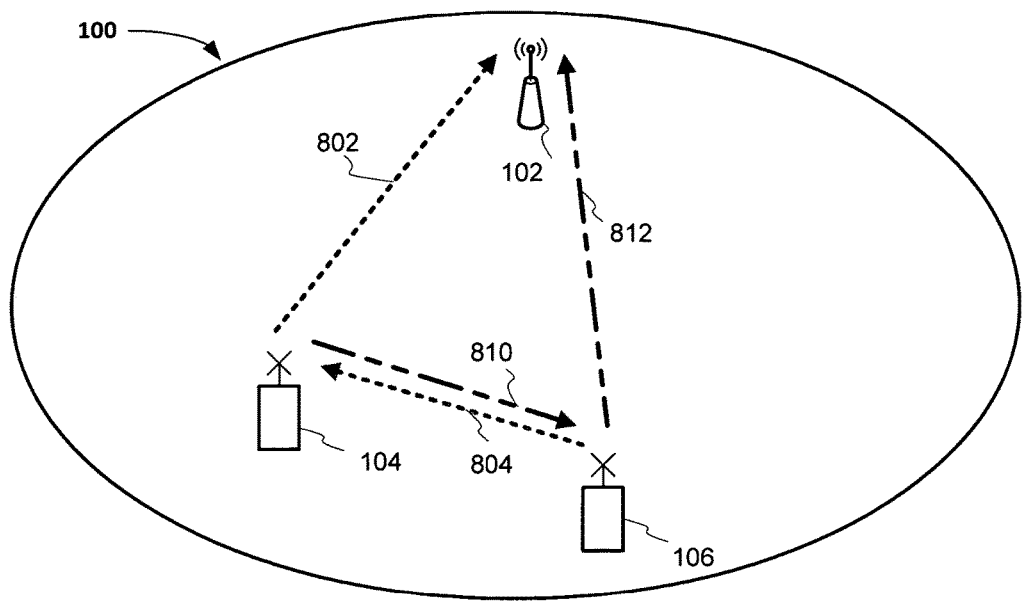
FIG. 8c illustrates a further alternative communication path for communicating HARQ feedback information for uplink data transmitted by a remote UE via a relay path according to some embodiments.

FIGS. 8b and 8c illustrate further communication paths by which HARQ ACK/NACKs may be sent in response to transmissions by the remote UE 106. According to the arrangements of FIGS. 8a and 8c the ACK/NACK 808, 810, 812 on the sidelink may be reported to both the eNB and Remote UE.

According to the arrangement of FIG. 8b the ACK/NACK may be reported 808 by Relay UE 104 over Uu to the eNB 102 and overheard by Remote UE 106 over sidelink. Alternatively, the ACK/NACKs may be reported by Relay UE 104 over the sidelink to Remote UE 106 and overheard by the eNB 102.

According to the arrangement of FIG. 8c the ACK/NACK may be reported 810 by the Relay UE 104 over sidelink to the Remote UE 106 and Forwarded 812 by the Remote UE 106 to the eNB 102 over Uu.

As a further alternative, the ACK/NACK could be reported by the Relay UE 104 over Uu to the eNB 102 and forwarded to the Remote UE 106 by the eNB 102.

Figure 8D:
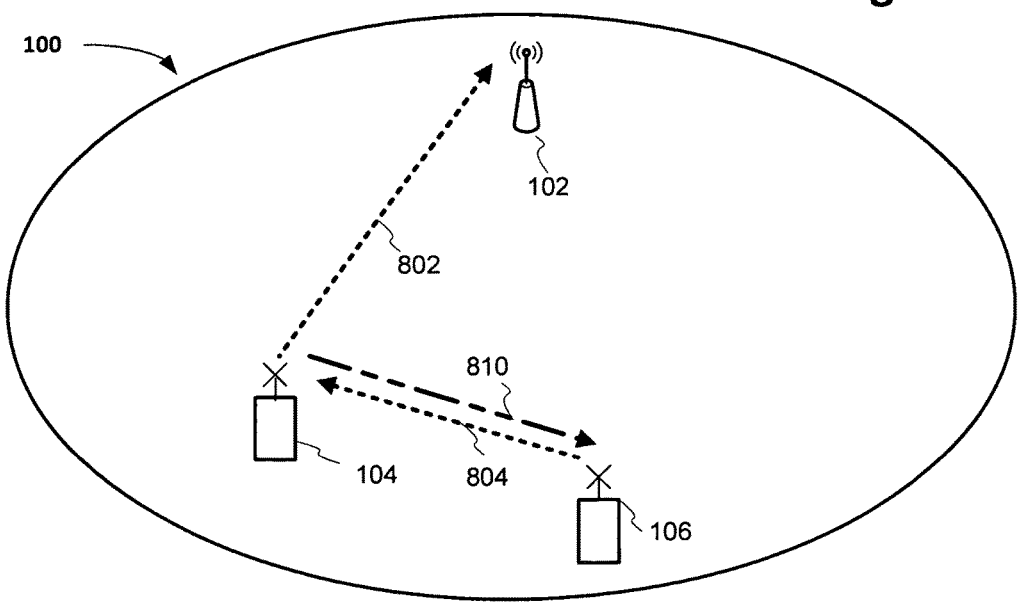
FIG. 8d illustrates a further alternative communication path for communicating HARQ feedback information for uplink data transmitted by a remote UE via a relay path according to some embodiments.

FIG. 8d illustrates a further communication path by which HARQ ACK/NACKs may be sent in response to transmissions by the remote UE 106. According to the arrangement of FIG. 8*a* the ACK/NACK 810 on the sidelink may be sent to the Remote UE 102.

Optimized Cellular HARQ Operation

The introduction of relay operation may also benefit from changes to cellular HARQ operation. For the DL forwarding example, the reason may be that each DL reception by a relay UE 104 should be acknowledged using a UL transmission. This ACK/NACK UL transmission may conflict with transmission or reception on the sidelink because sidelink operation is deployed in UL spectrum. Therefore, usage of the legacy HARQ timeline may substantially limit peak relay data rate that is achievable. Some embodiments may attempt to minimize the impact of HARQ transmissions by transmission of DL ACK/NACK feedback using the following features.

Figure 9:
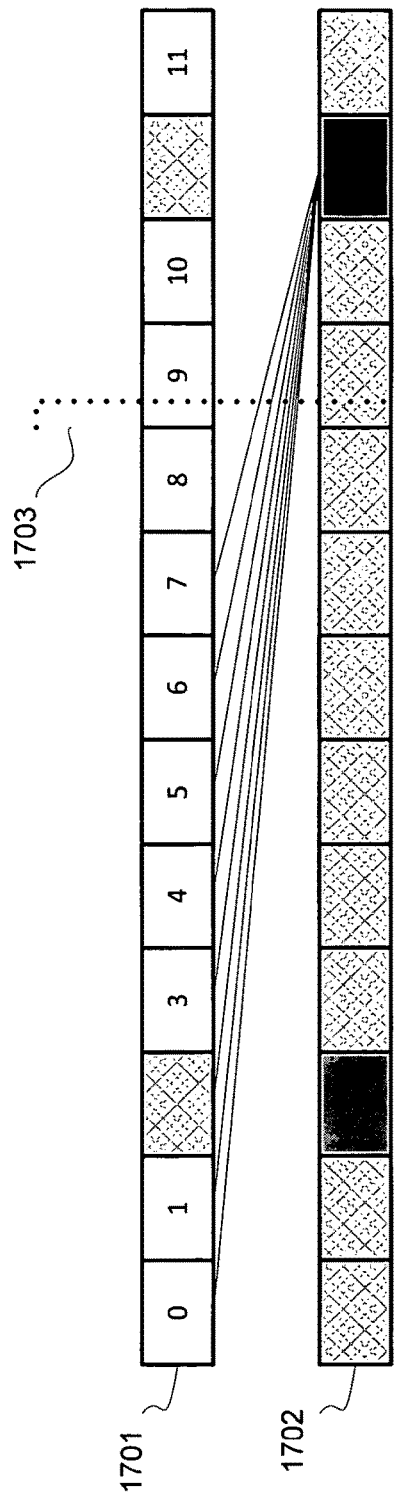
FIG. 9 illustrates multiplex HARQ feedback information for multiple subframes into a single uplink subframe transmission according to some embodiments.

According to some embodiments, a reference HARQ TDD UL-DL configuration may be provided to organize transmission and reception even in FDD. The mechanism is similar to the Release 12 DL eIMTA (enhanced interference managements and traffic adaptation) reference UL-DL configuration (and is illustrated in FIG. 9). The principle is to multiplex ACK/NACK feedback transmissions for multiple subframes into a single UL transmission in order to minimize relay interruption time.

This principle may be further extended to operate across multiple radio frames in this case, the number of HARQ processes may be further increased and new HARQ timing rules may need to be defined. This option may require feedback for multiple subframes and thus new feedback channels may be needed. One option is to reuse HARQ feedback mechanisms which may be defined for large scale carrier aggregation operation where up to 32 component carriers (CCs) can be supported (e.g. the PUCCH Format 4 or 5, which is defined in LTE Rel.13 and that may carry in the region of 128 bits, may be reused to carry ACK/NACK for a large bundle of subframes). Moreover, this format may also incorporate sidelink ACK/NACK feedbacks, as discussed in the previous subsection.

Figure 10:
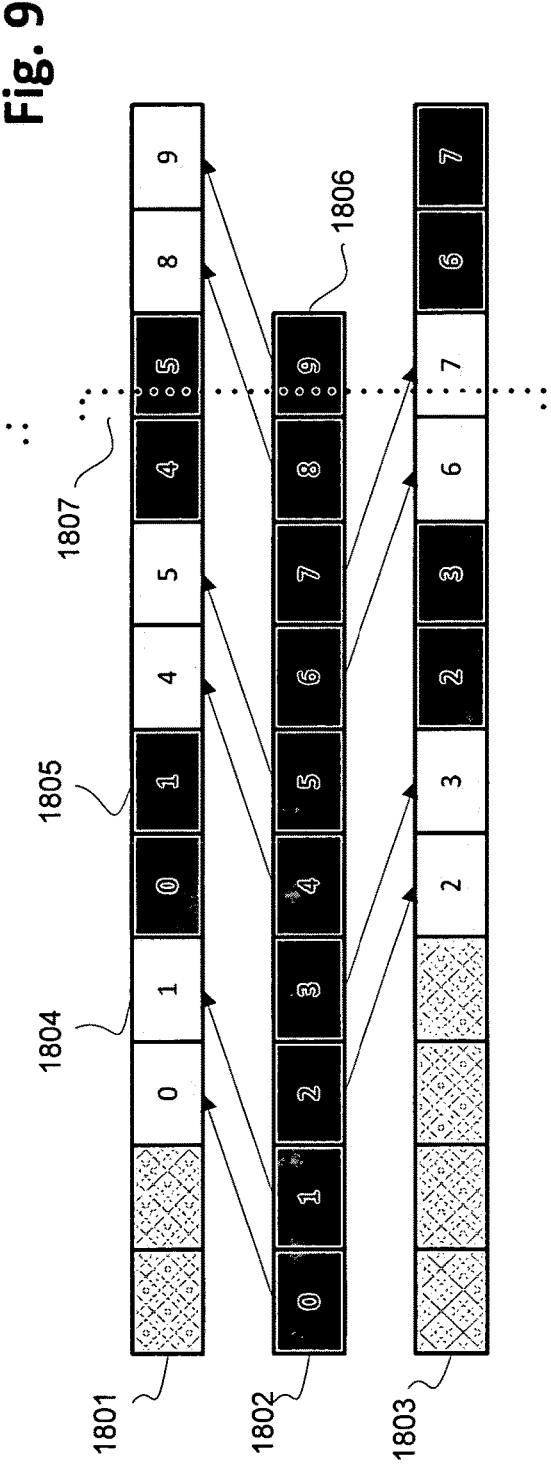
FIG. 10 illustrates a HARQ feedback mechanism based on switching between multiple relay paths according to some embodiments.

According to some embodiments, an ACK/NACK transmission penalty may be avoided by activating more than one relay path and switching between them periodically (as illustrated in FIG. 10). In this option, the cellular HARQ timeline is not changed.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 11:
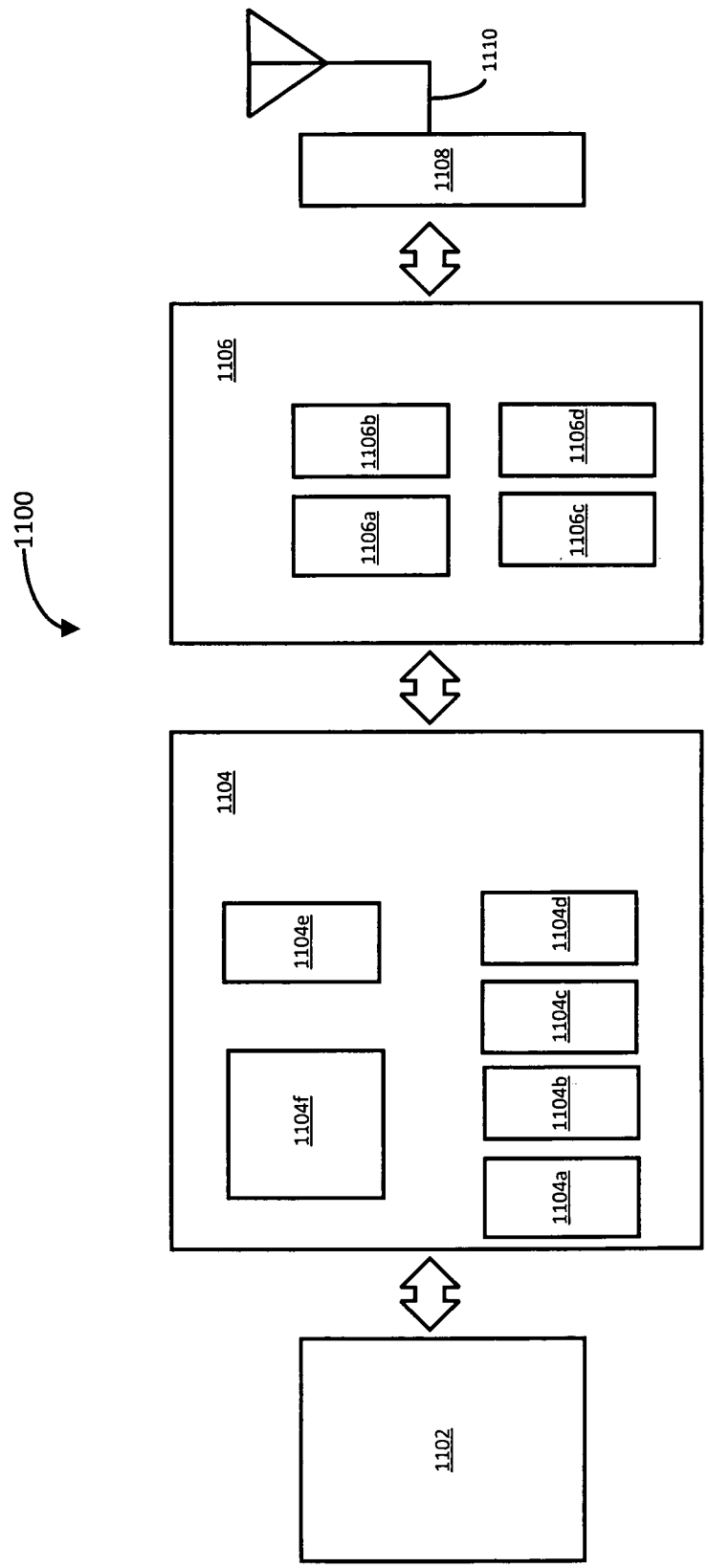
FIG. 11 is a block diagram of an example User Equipment device operable to implement some embodiments.

Embodiments described herein may be implemented into a system using any suitably configured hardware and/or software. FIG. 11 illustrates, for one embodiment, example components of a User Equipment (UE) device 1100. In some embodiments, the UE device 1100 may include application circuitry 1102, baseband circuitry 1104, Radio Frequency (RF) circuitry 1106, front-end module (FEM) circuitry 1108 and one or more antennas 1110, coupled together at least as shown.

The application circuitry 1102 may include one or more application processors. For example, the application circuitry 1102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1104 may include circuitry such as, but not limited to, one or more single-core or multi-core processors. The baseband circuitry 1104 may include one or more baseband processors and/or control logic to process baseband signals received from a receive signal path of the RF circuitry 1106 and to generate baseband signals for a transmit signal path of the RF circuitry 1106. Baseband processing circuitry 1104 may interface with the application circuitry 1102 for generation and processing of the baseband signals and for controlling operations of the RF circuitry 1106. For example, in some embodiments, the baseband circuitry 1104 may include a second generation (2G) baseband processor 1104*a*, third generation (3G) baseband processor 1104*b*, fourth generation (4G) baseband processor 1104*c*, and/or other baseband processor(s) 1104*d* for other existing generations, generations in development or to be developed in the future (e.g., fifth generation (5G), 6G, etc.). The baseband circuitry 1104 (e.g., one or more of baseband processors 1104*a-d*) may handle various radio control functions that enable communication with one or more radio networks via the RF circuitry 1106. The radio control functions may include, but are not limited to, signal modulation/demodulation, encoding/decoding, radio frequency shifting, etc. In some embodiments, modulation/demodulation circuitry of the baseband circuitry 1104 may include Fast-Fourier Transform (FFT), precoding, and/or constellation mapping/demapping functionality. In some embodiments, encoding/decoding circuitry of the baseband circuitry 1104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1104*e* of the baseband circuitry 1104 may be configured to run elements of the protocol stack for signaling of the PHY, MAC, RLC, PDCP and/or RRC layers. In some embodiments, the baseband circuitry may include one or more audio digital signal processor(s) (DSP) 1104*f*. The audio DSP(s) 104*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1104 and the application circuitry 1102 may be implemented together such as, for example, on a system on a chip (SOC).

In some embodiments, the baseband circuitry 1104 may provide for communication compatible with one or more radio technologies. For example, in some embodiments, the baseband circuitry 1104 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 1104 is configured to support radio communications of more than one wireless protocol may be referred to as multi-mode baseband circuitry.

RF circuitry 1106 may enable communication with wireless networks using modulated electromagnetic radiation through a non-solid medium. In various embodiments, the RF circuitry 1106 may include switches, filters, amplifiers, etc. to facilitate the communication with the wireless network. RF circuitry 1106 may include a receive signal path which may include circuitry to down-convert RF signals received from the FEM circuitry 1108 and provide baseband signals to the baseband circuitry 1104. RF circuitry 1106 may also include a transmit signal path which may include circuitry to up-convert baseband signals provided by the baseband circuitry 1104 and provide RF output signals to the FEM circuitry 1108 for transmission.

In some embodiments, the RF circuitry 1106 may include a receive signal path and a transmit signal path. The receive signal path of the RF circuitry 1106 may include mixer circuitry 1106a, amplifier circuitry 1106b and filter circuitry 1106c. The transmit signal path of the RF circuitry 1106 may include filter circuitry 1106c and mixer circuitry 1106a. RF circuitry 1106 may also include synthesizer circuitry 1106d for synthesizing a frequency for use by the mixer circuitry 1106a of the receive signal path and the transmit signal path. In some embodiments, the mixer circuitry 1106a of the receive signal path may be configured to down-convert RF signals received from the FEM circuitry 1108 based on the synthesized frequency provided by synthesizer circuitry 1106d. The amplifier circuitry 1106b may be configured to amplify the down-converted signals and the filter circuitry 1106c may be a low-pass filter (LPF) or band-pass filter (BPF) configured to remove unwanted signals from the down-converted signals to generate output baseband signals. Output baseband signals may be provided to the baseband circuitry 1104 for further processing. In some embodiments, the output baseband signals may be zero-frequency baseband signals, although this is not a requirement. In some embodiments, mixer circuitry 1106a of the receive signal path may comprise passive mixers, although the scope of the embodiments is not limited in this respect.

In some embodiments, the mixer circuitry 1106a of the transmit signal path may be configured to up-convert input baseband signals based on the synthesized frequency provided by the synthesizer circuitry 1106d to generate RF output signals for the FEM circuitry 1108. The baseband signals may be provided by the baseband circuitry 1104 and may be filtered by filter circuitry 1106c. The filter circuitry 1106c may include a low-pass filter (LPF), although the scope of the embodiments is not limited in this respect.

In some embodiments, the mixer circuitry 1106a of the receive signal path and the mixer circuitry 1106a of the transmit signal path may include two or more mixers and may be arranged for quadrature downconversion and/or upconversion respectively. In some embodiments, the mixer circuitry 1106a of the receive signal path and the mixer circuitry 1106a of the transmit signal path may include two or more mixers and may be arranged for image rejection (e.g., Hartley image rejection). In some embodiments, the mixer circuitry 1106a of the receive signal path and the mixer circuitry 1106a may be arranged for direct downconversion and/or direct upconversion, respectively. In some embodiments, the mixer circuitry 1106a of the receive signal path and the mixer circuitry 1106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1106 may include analog-to-digital converter (ADC) and digital-to-analog converter (DAC) circuitry and the baseband circuitry 1104 may include a digital baseband interface to communicate with the RF circuitry 1106.

In some dual-mode embodiments, a separate radio IC circuitry may be provided for processing signals for each spectrum, although the scope of the embodiments is not limited in this respect.

In some embodiments, the synthesizer circuitry 1106d may be a fractional-N synthesizer or a fractional N/N+1 synthesizer, although the scope of the embodiments is not limited in this respect as other types of frequency synthesizers may be suitable. For example, synthesizer circuitry 1106d may be a delta-sigma synthesizer, a frequency multiplier, or a synthesizer comprising a phase-locked loop with a frequency divider.

The synthesizer circuitry 1106d may be configured to synthesize an output frequency for use by the mixer circuitry 1106a of the RF circuitry 1106 based on a frequency input and a divider control input. In some embodiments, the synthesizer circuitry 1106d may be a fractional N/N+1 synthesizer.

In some embodiments, frequency input may be provided by a voltage controlled oscillator (VCO), although that is not a requirement. Divider control input may be provided by either the baseband circuitry 1104 or the applications processor 1102 depending on the desired output frequency. In some embodiments, a divider control input (e.g., N) may be determined from a look-up table based on a channel indicated by the applications processor 1102.

Synthesizer circuitry 1106d of the RF circuitry 1106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 1106 may include an IQ/polar converter.

FEM circuitry 1108 may include a receive signal path which may include circuitry configured to operate on RF signals received from one or more antennas 1110, amplify the received signals and provide the amplified versions of the received signals to the RF circuitry 1106 for further processing. FEM circuitry 1108 may also include a transmit signal path which may include circuitry configured to amplify signals for transmission provided by the RF circuitry 1106 for transmission by one or more of the one or more antennas 1110.

In some embodiments, the FEM circuitry 1108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1106). The transmit signal path of the FEM circuitry 1108 may include a power amplifier (PA) to amplify input RF signals (e.g., provided by RF circuitry 1106), and one or more filters to generate RF signals for subsequent transmission (e.g., by one or more of the one or more antennas 1110.

Figure 12:
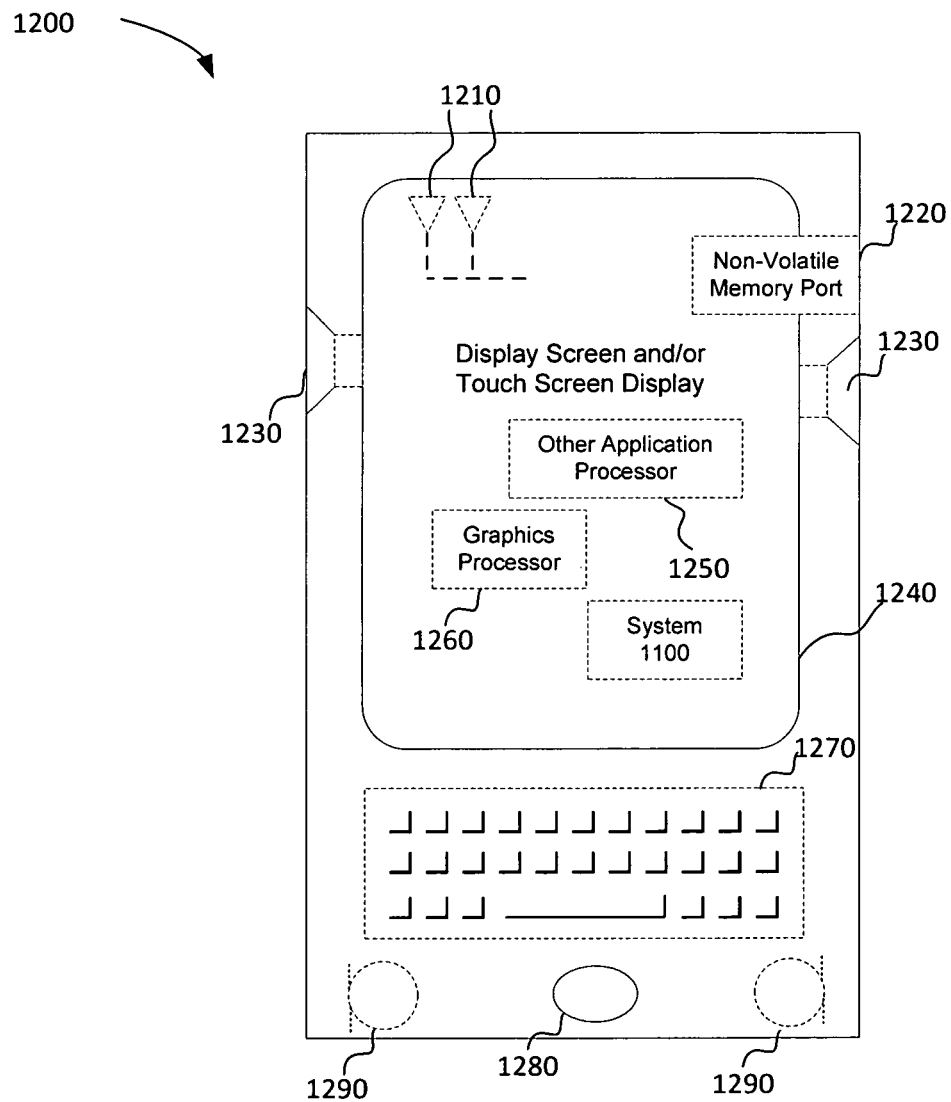
FIG. 12 is a block diagram showing an example wireless apparatus configured for communicating in a wireless network according to one or more of the inventive methods disclosed herein.

FIG. 12 shows an embodiment in which the electronic device 1100 implements a remote UE 106 in the specific form of a mobile device 1200.

In various embodiments, user interfaces could include, but are not limited to, a display 1240 (e.g., a liquid crystal display, a touch screen display, etc.), a speaker 1230, a microphone 1290, one or more cameras 1280 (e.g., a still camera and/or a video camera), a flashlight (e.g., a light emitting diode flash), and a keyboard 1270.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, a network interface to communicate with components of a positioning network, e.g., a global positioning system (GPS) satellite.

In various embodiments, the electronic device 1100 may be a mobile computing device such as, but not limited to, a laptop computing device, a tablet computing device, a netbook, a mobile phone, etc. In various embodiments, system 1200 may have more or less components, and/or different architectures.

In embodiments, the implemented wireless network may be a 3rd Generation Partnership Project's long term evolution (LTE) advanced wireless communication standard, which may include, but is not limited to releases 8, 9, 10, 11, 12, and 13 or later, of the 3GPP's LTE-A standards.

In some embodiments, the electronic device 1100 may be configured to perform one or more processes, techniques, and/or methods as described herein, or portions thereof.

EXAMPLES

Example 1 may include a method for an evolved Node B, eNB, to control enhanced Device-to-device (D2D), or sidelink relay operation comprising: configuring, by the eNB, of relay operation functions; collecting, by the eNB, of radio measurements on direct links between served user equipment, UEs; collecting, by the eNB, of radio measurements on cellular links of served UEs; forming, by the eNB, relay candidate sets for a UE; selecting, by the eNB, a direct cellular path or relay path; sending, by the eNB, a resource grant for relay transmission; receiving, by the eNB, a HARQ ACK/NACK feedback for relay operation; and receiving, by the eNB, a channel quality feedback for relay radio link.

Example 2 may include the method of example 1 or some other example herein, wherein relay operation functions comprise of relay selection criteria, relay power control parameters, reference signal transmission resources, relay antenna ports.

Example 3 may include the method of example 1 or some other example herein, wherein the radio measurements comprise of coarse measurements and fine measurements.

Example 4 may include the method of example 3 or some other example herein, wherein the coarse measurements comprise of sidelink RSRP, RSRQ, RSSI measurements and cellular RSRP, RSRQ, RSSI measurements.

Example 5 may include the method of example 3 or some other example herein, wherein the fine measurements comprise of sidelink CQI, PMI, RI.

Example 6 may include the method of example 1 or some other example herein, wherein the eNB selects the data path among the cellular direct path and multiple relays paths based on a configured criterion.

Example 7 may include the method of example 1 or some other example herein, wherein the relay resource grant is sent using a Downlink Control Information (DCI) format.

Example 8 may include the method of example 7 or some other example herein, wherein the target UE decodes the relay resource grant.

Example 9 may include the method of example 7 or some other example herein, wherein the target and relay UE decode the relay resource grant.

Example 10 may include the method of example 7 or some other example herein, wherein the resource grant contains MCS.

Example 11 may include the method of example 7 or some other example herein, wherein the DCI is scrambled with sidelink relay RNTI (SL-RELAY-RNTI).

Example 12 may include the method of example 1 or some other example herein, wherein the eNB receives ACK/NACK for relay path and grants additional relay resources for retransmission if NACK is received.

Example 13 may include the method of example 1 or some other example herein, wherein the eNB configures cellular HARQ timeline for relay operation.

Example 14 may include the method of example 12 or some other example herein, wherein multiple DL subframes are acknowledged in a single UL subframe.

Example 15 may include the method of example 2 or some other example herein, wherein the power control parameters comprise of power control parameters for UL relay and for DL relay.

Example 16 may include the method of example 2 or some other example herein, wherein the power control parameters include a power offset relative to UL transmit power.

Example 17 may include the method of example 2 or some other example herein, wherein the power control parameters comprise of an indication whether cellular pathloss or sidelink pathloss is used for calculation sidelink transmission power for relay operation.

Example 18 may include the method of example 1 or some other example herein, wherein PUCCH Format 4 is used for acknowledging reception of cellular hop relay traffic and/or sidelink hop relay traffic.

Example 19 may include a method for a User Equipment (UE) to relay data comprising: transmitting, by the UE, of reference signals for relay link quality measurements; measuring, by the UE, of relay link quality indicators; reporting, by the UE, of relay link quality indicators to a eNB; receiving, by the UE, of control message with configuration of relay functions; receiving, by the UE, of resource grant for relay operation; receiving, by the UE, of relay data using sidelink air-interface; transmitting, by the UE, of relay data using sidelink air-interface; transmitting, by the UE, of cellular ACK/NACK following modified timeline; transmitting, by the UE, of sidelink ACK/NACK; and using, by the UE, of sidelink power control based on pathloss to another UE;

Example 20 may include a method for a User Equipment (UE) to transmit and receive data through relay comprising: transmitting, by the UE, of reference signals for relay link quality measurements; measuring, by the UE, of relay link quality indicators; reporting, by the UE, of relay quality indicators to a eNB; receiving, by the UE, of control message with configuration of relay operation functions; receiving, by the UE, of resource grant for using relay operation; receiving, by the UE, of data using sidelink air-interface; transmitting, by the UE, of data using sidelink air-interface; transmitting, by the UE, of sidelink ACK/NACK; and using, by the UE, of sidelink power control base on pathloss to another UE;

Example 21 may include a method, technique, or process as described in or related to any of examples 1-20, or portions or parts thereof.

Example 22 may include an apparatus comprising logic, modules, and/or circuitry to perform one or more elements of a method described in or related to any of examples 1-20, or any other method or process described herein Example 23 may include an apparatus comprising means to perform one or more elements of a method described in or related to any of examples 1-20, or any other method or process described herein.

Example 24 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 25 may include an apparatus comprising logic, modules, and/or circuitry to perform one or more elements of a method described in or related to any of examples 1-20, or any other method or process described herein.

Example 26 may include a method of communicating in a wireless network as shown and described herein.

Example 27 may include a system for providing wireless communication as shown and described herein.

Example 28 may include a device for providing wireless communication as shown and described herein.

Example 29 may include an apparatus for a User Equipment (UE) for transmitting and receiving data via a sidelink interface under control of an Evolved Node B (eNB), the apparatus comprising: receive circuitry to receive a reference signal on a sidelink interface; control circuitry to determine one or more sidelink quality indicators based on the received reference signal; and transmit circuitry to transmit the determined sidelink quality indicators to the eNB.

Example 30 may include the apparatus of example 29, wherein the sidelink quality indicators comprise at least one of: sidelink Reference Signal Received Power (sidelink RSRP); sidelink Reference Signal Received Quality (sidelink RSRQ) and sidelink Reference Signal Strength Indicator (sidelink RSSI) measurements.

Example 31 may include the apparatus of example 29 or example 30, wherein the UE is a Remote UE to receive and transmit data from the eNB via a relay path using the sidelink interface.

Example 32 may include the apparatus of example 31, the transmit circuitry further to transmit the reference signal on the sidelink interface to at least one Relay UE.

Example 33 may include the apparatus of example 31, the receive circuitry further to: receive a first indication, via a sidelink control channel, of first radio resources on the sidelink interface to be used for receiving data; and receive data on the sidelink interface based on the first indication of first radio resources.

Example 34 may include the apparatus of any of examples 31 to 33, the receive circuitry further to: receive a second indication, via a downlink control channel, of first radio resources on a first downlink interface comprising a direct link between the Remote UE and the eNB to be used for receiving data; and receive data on the downlink interface based on the second indication of first radio resources.

Example 35 may include the apparatus of example 34, the receive circuitry further to receive data concurrently on the downlink interface and the sidelink interface.

Example 36 may include the apparatus of any of the examples 31 to 35, the control circuitry further to: monitor an active path, wherein the active path is any one of a first downlink from the eNB to the Remote UE and a combination of a second downlink from the eNB to at least one Relay UE and at least one sidelink from the at least one Relay UE through which data is transmitted to arrive at the Remote UE.

Example 37 may include the apparatus of example 36, the control circuitry further to: determine second sidelink quality indicators on the monitored active path; and transmit circuitry further to transmit the second sidelink quality indicators, on a first direct interface, to the eNB, wherein the second sidelink quality indicators comprise at least one of: Channel Quality Indicators (CQI), Channel State Information (CSI) and Rank Indicators (RI).

Example 38 may include the apparatus of example 31 or 32, the receive circuitry further to: receive an indication, via a downlink control channel, of first radio resources on the sidelink interface to be used for receiving data; and receive data on the sidelink interface based on the indication of first radio resources.

Example 39 may include the apparatus of example 36, the receive circuitry further to: receive an indication, via the monitored active path, of first radio resources to be used for receiving data; and receive data on one of the sidelink interface or the first downlink interface based on the indication of first radio resources.

Example 40 may include the apparatus of any of examples 31 to 39, the control circuit further to determine whether the data was successfully received on the sidelink interface; and the transmit circuitry further to: transmit a Hybrid Automatic Repeat Request Acknowledgement (HARQ ACK) on a direct link to the eNB on determination that the data was successfully received; and transmit a Hybrid Automatic Repeat Request non-acknowledgement (HARQ NACK) on a direct link to the eNB on determination that the data was not successfully received.

Example 41 may include the apparatus of any of examples 31 to 39, the control circuit further to determine whether the data was successfully received on the sidelink interface; and the transmit circuitry further to: transmit a Hybrid Automatic Repeat Request Acknowledgement (HARQ ACK) on the sidelink interface to the Relay UE on determination that the data was successfully received; and transmit a Hybrid Automatic Repeat Request non-acknowledgement (HARQ NACK) on a sidelink interface to the Relay UE on determination that the data was not successfully received.

Example 42 may include the apparatus of examples 40 or 41, the control circuitry further to multiplex HARQ ACKs and HARQ NACKs for multiple received subframes; and the transmit circuitry further to transmit the multiplexed HARQ ACKs and HARQ NACK in a single uplink transmission.

Example 43 may include the apparatus of any of examples 31 to 42, the transmit circuitry further to transmit, on the first direct interface to the eNB, a Buffer Status Report (BSR) and scheduling request to request second radio resources for uplink transmission.

Example 44 may include the apparatus of example 43, the receive circuitry further to receive an indication, via the downlink control channel, of second radio resources on the sidelink interface to be used for transmitting data; and the transmit circuitry further to transmit data on the sidelink interface based on the indication of second radio resources.

Example 45 may include the apparatus of example 43 or 44, the control circuitry further to determine uplink transmission parameters and scrambling sequences associated with the Relay UE; and the receive circuitry further to: overhear a HARQ ACK, based on the determined uplink transmission parameters and scrambling sequences, sent from the Relay UE to the eNB on successful reception of data on the sidelink interface of the Relay UE; and overhear a HARQ NACK, based on the determined uplink transmission parameters and scrambling sequences, sent from the Relay UE to the eNB if data is not received via the sidelink interface of the Relay UE.

Example 46 may include the apparatus of example 43 or 44, the receive circuitry further to receive a HARQ ACK on the sidelink interface from the Relay UE on successful reception of data via the sidelink interface of the Relay UE and receive a HARQ NACK from the Relay UE if data is not received via the sidelink interface of the Relay UE.

Example 47 may include the apparatus of example 46, the transmit circuitry further to forward the received HARQ ACK or HARQ NACK to the eNB on the first direct interface.

Example 48 may include the apparatus of example 29 or 30, wherein the UE is a Relay UE, the Relay UE coupled to a Remote UE via a sidelink interface and to an eNB via a second direct interface, the Relay UE to forward data between the eNB and the Remote UE.

Example 49 may include the apparatus of example 48, the receive circuitry further to receive an indication, via the downlink control channel, of first radio resources on the sidelink interface to be used for transmitting data; and transmit circuitry further to transmit data on the sidelink interface based on the indication of first radio resources.

Example 50 may include the apparatus of any of examples 48 or 49, the control circuitry further to determine downlink transmission parameters and scrambling sequences associated with the Remote UE; and the receive circuitry further to: overhear a HARQ ACK, based on the determined downlink transmission parameters and scrambling sequences, sent from the Remote UE to the eNB on successful reception of data on the sidelink interface of the Remote UE; and overhear a HARQ NACK, based on the determined downlink transmission parameters and scrambling sequences, sent from the Remote UE to the eNB if data is not received via the sidelink interface of the Remote UE.

Example 51 may include the apparatus of any of examples 48 to 50, the receive circuitry further to receive a HARQ ACK on the sidelink from the Remote UE on successful reception of data via the sidelink interface of the Remote UE and receive a HARQ NACK on the sidelink from the Remote UE if data is not received via the sidelink interface of the Remote UE.

Example 52 may include the apparatus of example 51, the transmit circuitry further to forward the received HARQ ACK or HARQ NACK to the eNB on the second direct interface.

Example 53 may include the apparatus of example 48, the receive circuitry further to receive data from the Remote UE on the sidelink interface and the transmit circuitry further to forward the received data to the eNB on the second direct interface.

Example 54 may include the apparatus of example 53, the receive circuitry further to: receive an indication, via a sidelink control channel, of second radio resources on the sidelink interface to be used for receiving data; receive data on the sidelink interface based on the indication of second radio resources.

Example 55 may include the apparatus of example 53, the receive circuitry further to: receive an indication, via a downlink control channel, of second radio resources on the sidelink interface to be used for receiving data; and receive data on the sidelink interface based on the indication of second radio resources.

Example 56 may include the apparatus of any of the examples 53 to 55, the control circuitry further to determine whether the data was successfully received on the sidelink interface; and the transmit circuitry further to: transmit a HARQ ACK to the eNB on the second direct interface on determination that the data was successfully received; and transmit a HARQ NACK to the eNB on the second direct interface on determination that the data was successfully received.

Example 57 may include the apparatus of example 49, the control circuitry further to determine whether the data was successfully received on the sidelink interface; and the transmit circuitry further to: transmit a HARQ ACK to the Remote UE on the sidelink interface on determination that the data was successfully received; and transmit a HARQ NACK to the Remote UE on the sidelink interface on determination that the data was successfully received.

Example 58 may include the apparatus of any of examples 29 to 57, the control circuitry further to: determine a pathloss on the sidelink interface based on the received sidelink quality indicators; and select a sidelink transmission power based on the determined pathloss.

Example 59 may include a Computer Readable Medium comprising computer program code that, when executed on processing circuitry, causes the processing circuitry to: obtain a reference signal received on a sidelink interface; determine one or more sidelink quality indicators based on the received reference signal; and generate a message comprising the determined sidelink quality indicators for transmission to an Evolved Node B (eNB).

Example 60 may include the an apparatus for an Evolved Node B (eNB) for controlling relay transmission via a sidelink interface in a wireless network, the apparatus comprising: receive circuitry to receive sidelink quality indicators associated with at least one sidelink channel between a remote UE and at least one Relay UE; control circuitry to select one of a direct path and a relay path via a Relay UE based on the received sidelink quality indicators; and transmit circuitry to transmit an indication of radio resources on the sidelink interface between the selected Relay UE and the Remote UE to be used for relay transmission between the eNB and the Remote UE in response to selection of a relay path.

Example 61 may include the apparatus of example 60, wherein the sidelink quality indicators comprise at least one of: sidelink Reference Signal Received Power (sidelink RSRP); sidelink Reference Signal Received Quality (sidelink RSRQ) and sidelink Reference Signal Strength Indicator (sidelink RSSI) measurements.

Example 62 may include the apparatus of examples 60 or 61, the control circuitry further to obtain a relay candidate set comprising at least one Relay UE within communication range of the Remote UE.

Example 63 may include the apparatus of example 62, the control circuitry further to obtain the relay candidate set by: determining the Relay UEs within communication range of the Remote UE with the most desirable sidelink quality indicators; and selecting the Relay UEs with the most desirable sidelink quality indicators.

Example 64 may include the apparatus of any of examples 60 to 63, the transmit circuitry further to transmit a shared indication, via a downlink control channel, of first radio resources on the sidelink interface to be used by the selected Relay UE for transmitting data and used by the Remote UE for receiving data, wherein the indication of first radio resources is scrambled with a RNTI common to the Remote UE and the selected Relay UE.

Example 65 may include the apparatus of any of examples 60 to 63, the transmit circuitry further to transmit a first indication, via a first downlink control channel, of first radio resources on the sidelink interface to the selected Relay UE for transmitting data and a second indication, via a second downlink control channel, of first radio resources on the sidelink interface to the Remote UE for receiving data on the sidelink interface.

Example 66 may include the apparatus of any of examples 60 to 63, the control circuitry further to determine an active path; and the transmit circuitry further to transmit an indication, via the active path, of first radio resources to be used for transmitting and receiving data.

Example 67 may include the apparatus of any of examples 60 to 66, the control circuitry further to determine downlink transmission parameters and scrambling sequences of the Remote UE; and the receive circuitry further to: overhear a HARQ ACK, based on the determined downlink transmission parameters and scrambling sequences, sent from the Remote UE to the Relay UE on successful reception of data on the sidelink interface of the Remote UE; and overhear a HARQ NACK, based on the determined downlink transmission parameters and scrambling sequences, sent from the Remote UE to the Relay UE if data is not received via the sidelink interface of the Remote UE.

Example 68 may include the apparatus of any of examples 60 to 66, the receive circuitry further to receive a HARQ ACK, on a second direct interface, forwarded by the selected Relay UE on successful reception of data via the sidelink interface of the Remote UE and receive a HARQ NACK, on the second direct interface, forwarded by the selected Relay UE if data is not received via the sidelink interface of the Remote UE.

Example 69 may include the apparatus of any of examples 60 to 68, the receive circuitry further to receive, on a first direct interface, a Buffer Status Report (BSR) and scheduling request from the Remote UE requesting resources for uplink transmission via the sidelink interface; and the transmit circuitry further to transmit an indication for second radio resources based on the received BSR and scheduling request.

Example 70 may include the apparatus of any of examples 69, the transmit circuitry further to transmit an indication to the remote UE, via the first downlink control channel, of second radio resources on the sidelink interface for transmitting data to the Relay UE via the sidelink interface.

Example 71 may include the apparatus of example 69, the transmit circuitry further to transmit a shared indication, via the downlink control channel, of second radio resources on the sidelink interface to be used by the Remote UE for transmitting data and the Relay UE for receiving data, wherein the indication of radio resources is scrambled with an RNTI common to the remote UE and Relay UE.

Example 72 may include the apparatus of example 69, the transmit circuitry further to: transmit a first indication, via a first downlink control channel, of second radio resources on the sidelink interface to the Remote UE for transmitting data; transmit a second indication, via a second downlink control channel, of the second radio resources on the sidelink interface to the selected Relay UE for receiving the data; and transmit a third indication of second radio resources on the second direct interface to the selected Relay UE for forwarding data to the eNB.

Example 73 may include the apparatus of any of examples 69 to 72, the control circuitry further to determine uplink transmission parameters and scrambling sequences of the Relay UE; and the receive circuitry further to: overhear, based on the determined uplink transmission parameters and scrambling sequences, a HARQ ACK sent from the Relay UE to the Remote UE on successful reception of data on the sidelink interface of the Relay UE; and overhear a HARQ NACK, based on the determined uplink transmission parameters and scrambling sequences, sent from the Relay UE to the Remote UE if data is not received via the sidelink interface of the Relay UE.

Example 74 may include the apparatus of any of examples 69 to 72, the receive circuitry further to receive a HARQ ACK, on the direct interface, from the selected Relay UE on successful reception of data on the sidelink interface of the Relay UE and receive a HARQ NACK, on the second direct interface, if data is not received via the sidelink interface of the Relay UE.

Example 75 may include the apparatus of example 74, the transmit circuitry further to forward the HARQ ACK or HARQ NACK on the first direct interface to the Remote UE.

Example 76 may include the apparatus of any of examples 60 to 75, the control circuitry further to: determine a pathloss on the sidelink interface based on the received sidelink quality indicators; select a sidelink transmission power based on the determined pathloss; and transmit circuitry further to transmit an indication of selected sidelink transmission power.

Example 77 may include a Computer readable medium comprising computer program instructions that, when executed on processing circuitry, causes the processing circuitry to: obtain sidelink quality indicators associated with at least one sidelink channel between a Remote UE and at least one Relay UE; select one of a direct path and a relay path via a Relay UE based on the received sidelink quality indicators; and generate a message comprising an indication of radio resources on the sidelink between the selected Relay UE and the Remote UE to be used for relay transmission between an Evolved Node B (eNB) and the Remote UE in response to selection of a relay path.

The foregoing description of one or more implementations provides illustration and description, but is not intended to be exhaustive or to limit the scope of the disclosure to precise form disclosed. Modifications and variations are possible in light of the above teachings or may be acquired from practice of various implementations of the disclosure.

The invention claimed is:

1. A User Equipment (UE) for transmitting and receiving data via a sidelink interface under control of an Evolved Node B (eNB), the UE comprising:
   receive circuitry to receive a reference signal on a sidelink interface;
   control circuitry to determine one or more sidelink quality indicators based on the received reference signal; and
   transmit circuitry to transmit the determined sidelink quality indicators to the eNB, wherein the receive circuitry is further to:
      receive a first indication, via a downlink control channel from the eNB, of first radio resources on the sidelink interface to be used for receiving first data;
      receive the first data on the sidelink interface based on the indication of first radio resources;
      receive a second indication, via a sidelink control channel, of second radio resources on the sidelink interface to be used for receiving second data; and
      receive the second data on the sidelink interface based on the second indication of second radio resources,
   wherein the UE is a remote UE that is to receive data from and transmit data to the eNB via a relay path using the sidelink interface.

2. The UE of claim 1, wherein the sidelink quality indicators comprise: sidelink Reference Signal Received Power (sidelink RSRP) indicators; sidelink Reference Signal Received Quality (sidelink RSRQ) indicators; or sidelink Reference Signal Strength Indicator (sidelink RSSI) indicators.

3. The UE of claim 1, the transmit circuitry further to transmit the reference signal on the sidelink interface to at least one Relay UE.

4. The UE of claim 1, the control circuitry further to determine whether the first or second data was successfully received on the sidelink interface; and
   the transmit circuitry further to:
      transmit a Hybrid Automatic Repeat Request Acknowledgement (HARQ ACK) on the sidelink interface to the Relay UE on determination that the first or second data was successfully received; and
      transmit a Hybrid Automatic Repeat Request non-acknowledgement (HARQ NACK) on a sidelink interface to the Relay UE on determination that the first or second data was not successfully received.

5. The UE of claim 4, the control circuitry further to multiplex HARQ ACKs and HARQ NACKs for multiple received subframes; and
   the transmit circuitry further to transmit the multiplexed HARQ ACKs and HARQ NACK in a single uplink transmission.

6. The UE of claim 1, the transmit circuitry further to transmit, on a first direct interface to the eNB, a Buffer Status Report (BSR), and a scheduling request to request third radio resources for uplink transmission.

7. The UE of claim 6, the receive circuitry further to receive a third indication, via the downlink control channel, of the third radio resources on the sidelink interface to be used for transmitting third data; and
   the transmit circuitry further to transmit the third data on the sidelink interface based on the third indication of third radio resources.

8. The UE of claim 1 the control circuitry further to:
   determine a pathloss on the sidelink interface based on the received sidelink quality indicators; and
   select a sidelink transmission power based on the determined pathloss.

9. One or more non-transitory, computer-readable media having instructions that, when executed on one or more processors, cause a device to:
   receive a reference signal on a sidelink interface;
   determine one or more sidelink quality indicators based on the received reference signal;
   transmit the determined sidelink quality indicators to an Evolved Node B(eNB);
   determine whether data was successfully received on the sidelink interface;
   determine Hybrid Automatic Repeat Request (HARQ) information, including acknowledgements (ACKs) or negative-acknowledgements (NACKs) for multiple received subframes on the sidelink interface based on determination of whether the data was successfully received;
   multiplex the HARQ information for the multiple received subframes; and
   transmit the multiplexed HARQ information in a single uplink transmission.

10. An Evolved Node B (eNB) for controlling relay transmission via a sidelink interface in a wireless network, the eNB comprising:
   receive circuitry to receive sidelink quality indicators associated with at least one sidelink channel between a remote UE and at least one Relay UE;
   control circuitry to select one of a direct path and a relay path via a Relay UE based on the received sidelink quality indicators; and
   transmit circuitry to:
      transmit an indication of radio resources on the sidelink interface between the selected Relay UE and the Remote UE to be used for relay transmission between the eNB and the Remote UE in response to selection of a relay path; and
      transmit a shared indication, via a downlink control channel, of first radio resources on the sidelink interface to be used by the selected Relay UE for transmitting data and used by the Remote UE for receiving data, wherein the indication of first radio resources is scrambled with a radio network temporary identifier (RNTI) common to the Remote UE and the selected Relay UE,
   wherein the control circuitry is further to obtain a relay candidate set that includes the at least one Relay UE within communication range of the Remote UE, to obtain the relay candidate set, the control circuitry is to:
   determine Relay UEs within communication range of the Remote UE with the most desirable sidelink quality indicators; and select the Relay UEs with the most desirable sidelink quality indicators.

11. One or more non-transitory, computer-readable media having instructions that, when executed on one or more processors, cause a device to:
   receive sidelink quality indicators associated with sidelink channels between a Remote user equipment (UE) and Relay UEs;
   obtain a relay candidate set comprising at least one Relay UE within communication range of the Remote UE by determining the Relay UEs within communication range of the Remote UE with the most desirable sidelink quality indicators, and selecting the Relay UEs with the most desirable sidelink quality indicators;

selecting one of a direct path and a relay path via a Relay UE based on the received sidelink quality indicators;

transmit an indication of radio resources on a sidelink between a selected Relay UE and the Remote UE to be used for relay transmission between an Evolved Node B (eNB) and the Remote UE in response to selection of a relay path; and transmit a shared indication, via a downlink control channel, of first radio resources on a sidelink interface to be used by the selected Relay UE for transmitting data and used by the Remote UE for receiving data, wherein the indication of first radio resources is scrambled with a RNTI common to the Remote UE and the selected Relay UE.

\* \* \* \* \*